United States Patent
Holzmann et al.

(10) Patent No.: US 12,551,830 B2
(45) Date of Patent: *Feb. 17, 2026

(54) INTERLOCKED STABLE FILTER ASSEMBLY

(71) Applicant: Cummins Filtration IP, Inc., Columbus, IN (US)

(72) Inventors: Mark V. Holzmann, Stoughton, WI (US); Scott W. Schwartz, Cottage Grove, WI (US); Gregory K. Loken, Stoughton, WI (US); Jessie A. Knight, Oregon, WI (US); Dane P. Miller, Madison, WI (US)

(73) Assignee: ATMUS FILTRATION IP INC., Nashville, TN (US)

( * ) Notice: Subject to any disclaimer, the term of this patent is extended or adjusted under 35 U.S.C. 154(b) by 150 days.

This patent is subject to a terminal disclaimer.

(21) Appl. No.: 18/388,572

(22) Filed: Nov. 10, 2023

(65) Prior Publication Data

US 2024/0075416 A1 Mar. 7, 2024

Related U.S. Application Data

(60) Continuation of application No. 17/516,431, filed on Nov. 1, 2021, now Pat. No. 11,813,559, which is a
(Continued)

(51) Int. Cl.
*B01D 46/00* (2022.01)
*B01D 46/10* (2006.01)
(Continued)

(52) U.S. Cl.
CPC ......... *B01D 46/0005* (2013.01); *B01D 46/10* (2013.01); *B01D 2201/0415* (2013.01);
(Continued)

(58) Field of Classification Search
None
See application file for complete search history.

(56) References Cited

U.S. PATENT DOCUMENTS

| 2,025,009 A | 12/1935 | Baker |
| 2,093,877 A | 9/1937 | Von Pentz |

(Continued)

FOREIGN PATENT DOCUMENTS

| AU | 2016369578 A1 | 6/2018 |
| CN | 1130539 A | 9/1996 |

(Continued)

OTHER PUBLICATIONS

Akro-Mils, "Nest & Stack Totes," retrieved from http://web.archive.org/web/20150323114331/https://akro-mils.com/produts/types/plastic-storage-containers/nest-stack-totes, 1 page (2015).
(Continued)

*Primary Examiner* — Gabriel E Gitman
(74) *Attorney, Agent, or Firm* — Benesch Friedlander Coplan & Aronoff LLP

(57) ABSTRACT

A filter assembly that includes a filter housing with a housing interlocking feature, a filter cover with a filter cover interlocking feature, and a filter element with a filter element interlocking feature is disclosed. The filter element is positionable within the filter housing, and the filter cover is attachable to a top portion of at least one of the filter element and the filter housing. The housing interlocking feature, the filter cover interlocking feature, and the filter element interlocking feature are interlockable with each other and extend in a nonplanar configuration along at least one side of the filter element when the filter housing, the filter cover, and the filter element are assembled together.

15 Claims, 21 Drawing Sheets

Related U.S. Application Data division of application No. 16/083,945, filed as application No. PCT/US2017/021615 on Mar. 9, 2017, now Pat. No. 11,167,234.

(60) Provisional application No. 62/310,330, filed on Mar. 18, 2016.

(51) Int. Cl.
*F02M 35/024* (2006.01)
*B60H 3/06* (2006.01)

(52) U.S. Cl.
CPC .. *B01D 2201/304* (2013.01); *B01D 2265/026* (2013.01); *B01D 2271/022* (2013.01); *B01D 2271/027* (2013.01); *B01D 2279/60* (2013.01); *B60H 2003/065* (2013.01); *F02M 35/02416* (2013.01)

(56) References Cited

U.S. PATENT DOCUMENTS

| | | |
|---|---|---|
| 2,270,969 A | 1/1942 | Robinson |
| 2,306,325 A | 12/1942 | Sidney |
| 2,559,267 A | 7/1951 | Winslow et al. |
| 2,910,332 A | 10/1959 | Madsen |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,383,841 A | 5/1968 | Olson |
| 3,384,241 A | 5/1968 | Nostrand et al. |
| 3,494,113 A | 2/1970 | Kinney |
| 3,576,095 A | 4/1971 | Rivers |
| 3,582,095 A | 6/1971 | Bogaert |
| 3,598,738 A | 8/1971 | Pont |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,128,251 A | 12/1978 | Gaither et al. |
| 4,129,429 A | 12/1978 | Humbert et al. |
| 4,144,169 A | 3/1979 | Grueschow |
| 4,181,313 A | 1/1980 | Hillier et al. |
| 4,211,543 A | 7/1980 | Tokar et al. |
| 4,257,890 A | 3/1981 | Hurner |
| 4,300,928 A | 11/1981 | Sugie |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,473,471 A | 9/1984 | Robichaud et al. |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,865,636 A | 9/1989 | Raber |
| 4,915,831 A | 4/1990 | Taylor |
| 4,925,561 A | 5/1990 | Ishii et al. |
| 4,951,834 A | 8/1990 | Aikins |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,071,456 A | 12/1991 | Binder et al. |
| 5,094,745 A | 3/1992 | Reynolds |
| 5,114,572 A | 5/1992 | Hunter et al. |
| 5,120,334 A | 6/1992 | Cooper |
| 5,171,430 A | 12/1992 | Beach et al. |
| 5,203,994 A | 4/1993 | Janik |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,228,891 A | 7/1993 | Adiletta |
| 5,258,118 A | 11/1993 | Gouritin et al. |
| 5,298,160 A | 3/1994 | Ayers et al. |
| 5,302,284 A | 4/1994 | Zeiner et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Brown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,702,602 A | 12/1997 | Brown et al. |
| 5,709,722 A | 1/1998 | Nagai et al. |
| 5,720,790 A | 2/1998 | Kometani et al. |
| 5,738,785 A | 4/1998 | Brown et al. |
| 5,753,116 A | 5/1998 | Baumann et al. |
| 5,753,117 A | 5/1998 | Jiang |
| 5,753,120 A | 5/1998 | Clausen et al. |
| 5,759,217 A | 6/1998 | Joy |
| 5,770,065 A | 6/1998 | Popoff et al. |
| 5,772,883 A | 6/1998 | Rothman et al. |
| 5,793,566 A | 8/1998 | Scura et al. |
| 5,795,361 A | 8/1998 | Lanier et al. |
| 5,803,024 A | 9/1998 | Brown |
| 5,820,646 A | 10/1998 | Gillingham et al. |
| 5,830,371 A | 11/1998 | Smith et al. |
| 5,853,439 A | 12/1998 | Gieseke et al. |
| 5,855,772 A | 1/1999 | Miller et al. |
| 5,863,424 A | 1/1999 | Lee |
| 5,891,402 A | 4/1999 | Sassa et al. |
| 5,893,939 A | 4/1999 | Rakocy et al. |
| 5,902,364 A | 5/1999 | Tokar et al. |
| 5,948,248 A | 9/1999 | Brown |
| 5,985,143 A | 11/1999 | Lin |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,099,612 A | 8/2000 | Bartos |
| 6,113,781 A | 9/2000 | Popoff et al. |
| 6,117,202 A | 9/2000 | Wetzel |
| 6,123,746 A | 9/2000 | Alvin et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,171,491 B1 | 1/2001 | Popoff et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin et al. |

(56) References Cited

U.S. PATENT DOCUMENTS

| | | |
|---|---|---|
| 6,238,561 B1 | 5/2001 | Liu et al. |
| 6,261,334 B1 | 7/2001 | Morgan et al. |
| 6,264,831 B1 | 7/2001 | Hawkins et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,322,697 B1 | 11/2001 | Hacker et al. |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,571,962 B2 | 6/2003 | Thomas |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,740,234 B1 | 5/2004 | Williams et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,823,996 B2 | 11/2004 | Durre |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,922,894 B2 | 8/2005 | Durre |
| 6,939,464 B1 | 9/2005 | Jiang et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 6,998,045 B2 | 2/2006 | Durre |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2 | 5/2006 | Katayama et al. |
| 7,070,641 B1 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke |
| 7,217,361 B2 | 5/2007 | Connor et al. |
| 7,237,682 B2 | 7/2007 | Reynolds et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2 | 12/2007 | Adamek et al. |
| 7,338,544 B2 | 3/2008 | Sporre et al. |
| 7,344,582 B2 | 3/2008 | Pearson et al. |
| 7,351,270 B2 | 4/2008 | Engelland et al. |
| 7,396,375 B2 | 7/2008 | Nepsund et al. |
| 7,425,226 B2 | 9/2008 | Powell |
| 7,435,341 B2 | 10/2008 | Crawford et al. |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,614,504 B2 | 11/2009 | South et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,662,216 B1 | 2/2010 | Terres et al. |
| 7,674,308 B2 | 3/2010 | Krisko et al. |
| 7,682,416 B2 | 3/2010 | Engelland et al. |
| 7,682,507 B2 | 3/2010 | Stamey et al. |
| 7,731,753 B2 | 6/2010 | Reo et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,882,961 B2 | 2/2011 | Menez et al. |
| 7,931,723 B2 | 4/2011 | Cuvelier |
| 7,935,255 B2 | 5/2011 | Jiang |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,043,504 B2 | 10/2011 | Malgorn |
| 8,048,187 B2 | 11/2011 | Merritt et al. |
| 8,057,669 B2 | 11/2011 | Beard et al. |
| 8,061,530 B2 | 11/2011 | Kindkeppel et al. |
| 8,062,399 B2 | 11/2011 | Nelson et al. |
| 8,096,423 B2 | 1/2012 | Menez et al. |
| 8,097,061 B2 | 1/2012 | Smith et al. |
| 8,101,003 B2 | 1/2012 | Krisko et al. |
| 8,119,002 B2 | 2/2012 | Schiavon et al. |
| 8,146,751 B2 | 4/2012 | Hawkins et al. |
| 8,167,966 B2 | 5/2012 | Amirkhanian et al. |
| 8,177,967 B2 | 5/2012 | Bagci et al. |
| 8,211,199 B2 | 7/2012 | Holmes et al. |
| 8,216,470 B2 | 7/2012 | Abdalla et al. |
| 8,220,640 B2 | 7/2012 | Schmitz et al. |
| 8,236,176 B2 | 8/2012 | Fall et al. |
| 8,241,383 B2 | 8/2012 | Schrage et al. |
| 8,276,763 B2 | 10/2012 | Shaam |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,333,890 B2 | 12/2012 | Wells et al. |
| 8,348,064 B2 | 1/2013 | Tandon |
| 8,357,219 B2 | 1/2013 | Boehrs et al. |
| 8,419,938 B2 | 4/2013 | Ries et al. |
| 8,430,657 B2 | 4/2013 | Simonelli et al. |
| 8,440,081 B2 | 5/2013 | Wieczorek |
| 8,480,779 B2 | 7/2013 | Boehrs et al. |
| 8,496,723 B2 | 7/2013 | Reichter et al. |
| 8,501,001 B2 | 8/2013 | Curt et al. |
| 8,506,666 B2 | 8/2013 | Haslebacher |
| 8,517,183 B2 | 8/2013 | Thomas et al. |
| 8,518,141 B2 | 8/2013 | Schrage et al. |
| 8,544,158 B2 | 10/2013 | Curt et al. |
| 8,550,656 B2 | 10/2013 | Mccarthy et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,709,247 B2 | 4/2014 | Beard et al. |
| 8,714,565 B1 | 5/2014 | Cornett et al. |
| 8,753,414 B2 | 6/2014 | Gebert |
| 8,778,043 B2 | 7/2014 | Krisko et al. |

(56) References Cited

U.S. PATENT DOCUMENTS

| | | |
|---|---|---|
| 8,840,699 B2 | 9/2014 | Bruce et al. |
| 8,845,897 B2 | 9/2014 | Wieczorek et al. |
| 8,852,308 B2 | 10/2014 | Jarrier |
| 8,906,128 B2 | 12/2014 | Reichter et al. |
| 8,911,498 B2 | 12/2014 | Bartish et al. |
| 8,926,725 B2 | 1/2015 | Loken et al. |
| 8,932,465 B2 | 1/2015 | Wells et al. |
| 9,011,683 B2 | 4/2015 | South et al. |
| 9,101,883 B2 | 8/2015 | Pugh et al. |
| 9,114,346 B2 | 8/2015 | Schrage et al. |
| 9,211,488 B2 | 12/2015 | South et al. |
| 9,308,476 B2 | 4/2016 | Martin et al. |
| 9,308,482 B2 | 4/2016 | Kaiser |
| 9,320,997 B2 | 4/2016 | Campbell et al. |
| 9,409,107 B2 | 8/2016 | Arakeri et al. |
| 9,415,333 B2 | 8/2016 | Kindkeppel et al. |
| 9,500,167 B2 | 11/2016 | Verdegan et al. |
| 9,724,627 B2 | 8/2017 | Malgorn et al. |
| 9,782,706 B1 | 10/2017 | Levy |
| 9,782,708 B2 | 10/2017 | Kindkeppel et al. |
| 9,943,790 B2 | 4/2018 | Page et al. |
| 10,010,816 B2 | 7/2018 | Moessinger et al. |
| 10,279,424 B2 | 5/2019 | Sudermann et al. |
| 10,300,417 B2 | 5/2019 | Wuebbeling |
| 10,309,078 B2 | 6/2019 | Wells et al. |
| 10,316,804 B2 | 6/2019 | Hasenfratz et al. |
| 10,343,099 B2 | 7/2019 | Kaiser |
| 10,493,385 B2 | 12/2019 | Glazewski et al. |
| 10,556,200 B2 | 2/2020 | Dirnberger et al. |
| 10,661,207 B2 | 5/2020 | Page et al. |
| 10,662,905 B2 | 5/2020 | Dirnberger et al. |
| 10,682,597 B2 | 6/2020 | Krull et al. |
| 10,729,999 B2 | 8/2020 | Nichols et al. |
| 10,731,315 B2 | 8/2020 | Wells et al. |
| 10,744,443 B2 | 8/2020 | Silvestro |
| 10,835,852 B2 | 11/2020 | Decoster et al. |
| 11,091,895 B2 | 8/2021 | Wells et al. |
| 11,141,687 B2 | 10/2021 | Knight et al. |
| 11,198,077 B2 | 12/2021 | Jiang et al. |
| 11,285,411 B2 | 3/2022 | Burgan et al. |
| 11,413,559 B2 | 8/2022 | Glazewski et al. |
| 11,446,595 B2 | 9/2022 | Malgorn et al. |
| 11,452,958 B2 | 9/2022 | Page et al. |
| 11,655,609 B2 | 5/2023 | Wells et al. |
| 11,724,220 B2 | 8/2023 | Ouweleen et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0158006 A1 | 10/2002 | Thomas |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0218150 A1 | 11/2003 | Blakemore et al. |
| 2003/0226790 A1 | 12/2003 | Brown et al. |
| 2004/0031745 A1 | 2/2004 | Moessinger et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0024061 A1 | 2/2005 | Cox et al. |
| 2005/0166561 A1 | 8/2005 | Schrage et al. |
| 2005/0173325 A1 | 8/2005 | Klein et al. |
| 2005/0178706 A1 | 8/2005 | Bagei |
| 2005/0178714 A1 | 8/2005 | Stockbower |
| 2005/0178715 A1 | 8/2005 | Thomas et al. |
| 2005/0193695 A1 | 9/2005 | Holmes et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0118474 A1 | 6/2006 | Kolczyk et al. |
| 2006/0180537 A1 | 8/2006 | Loftis et al. |
| 2006/0213139 A1 | 9/2006 | Stramandinoli |
| 2006/0219626 A1 | 10/2006 | Dworatzek et al. |
| 2007/0037428 A1 | 2/2007 | Annecke |
| 2007/0045167 A1 | 3/2007 | Jaroszczyk et al. |
| 2007/0095744 A1 | 5/2007 | Bagci et al. |
| 2007/0175815 A1 | 8/2007 | Thomas |
| 2007/0240392 A1 | 10/2007 | Ng et al. |
| 2007/0261374 A1 | 11/2007 | Nelson et al. |
| 2007/0267338 A1 | 11/2007 | Menez et al. |
| 2008/0011672 A1 | 1/2008 | Schwartz et al. |
| 2008/0022641 A1 | 1/2008 | Engelland et al. |
| 2008/0035587 A1 | 2/2008 | Wieczorek et al. |
| 2008/0047132 A1 | 2/2008 | Wieczorek |
| 2008/0087589 A1 | 4/2008 | Grzonka et al. |
| 2008/0107765 A1 | 5/2008 | Considine et al. |
| 2008/0110142 A1 | 5/2008 | Nelson et al. |
| 2008/0179263 A1 | 7/2008 | Wieczorek et al. |
| 2008/0237113 A1 | 10/2008 | Jensen |
| 2008/0250766 A1 | 10/2008 | Schrage et al. |
| 2008/0307759 A1 | 12/2008 | Reichter et al. |
| 2008/0308481 A1 | 12/2008 | Wieczorek et al. |
| 2009/0014381 A1 | 1/2009 | South et al. |
| 2009/0026124 A1 | 1/2009 | Schmitz et al. |
| 2009/0050554 A1 | 2/2009 | Shaam |
| 2009/0057213 A1 | 3/2009 | Schiavon et al. |
| 2009/0057219 A1 | 3/2009 | Bagci et al. |
| 2009/0064646 A1 | 3/2009 | Reichter et al. |
| 2009/0071892 A1 | 3/2009 | Malgorn |
| 2009/0090669 A1 | 4/2009 | Holzmann et al. |
| 2009/0095669 A1 | 4/2009 | South |
| 2009/0126324 A1 | 5/2009 | Smith et al. |
| 2009/0127198 A1 | 5/2009 | Salvador et al. |
| 2009/0135590 A1 | 5/2009 | Mccarthy et al. |
| 2009/0151311 A1 | 6/2009 | Reichter et al. |
| 2009/0193972 A1 | 8/2009 | Schwandt et al. |
| 2009/0241315 A1 | 10/2009 | Menez et al. |
| 2009/0242475 A2 | 10/2009 | Menez et al. |
| 2009/0249754 A1 | 10/2009 | Amirkhanian et al. |
| 2009/0326657 A1 | 12/2009 | Grinberg et al. |
| 2010/0001477 A1 | 1/2010 | Eyers et al. |
| 2010/0043366 A1 | 2/2010 | Boehrs et al. |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0101993 A1 | 4/2010 | Wells et al. |
| 2010/0108590 A1 | 5/2010 | Curt et al. |
| 2010/0114318 A1 | 5/2010 | Gittings et al. |
| 2010/0126919 A1 | 5/2010 | Hawkins et al. |
| 2010/0150764 A1 | 6/2010 | Simonelli et al. |
| 2010/0170209 A1 | 7/2010 | Nelson et al. |
| 2010/0176047 A1 | 7/2010 | Bagci et al. |
| 2010/0186353 A1 | 7/2010 | Ackermann et al. |
| 2010/0200490 A1 | 8/2010 | Martin et al. |
| 2010/0229513 A1 | 9/2010 | Eisengraeber-Pabst et al. |
| 2010/0258493 A1 | 10/2010 | Kindkeppel et al. |
| 2010/0263339 A1 | 10/2010 | Steins et al. |
| 2010/0294707 A1 | 11/2010 | Abdalla et al. |
| 2010/0294712 A1 | 11/2010 | Abdalla et al. |
| 2011/0089104 A1 | 4/2011 | Menez et al. |
| 2011/0132829 A1 | 6/2011 | Tucker et al. |
| 2011/0139699 A1 | 6/2011 | Tucker et al. |
| 2011/0197556 A1 | 8/2011 | Brown et al. |
| 2011/0203099 A1 | 8/2011 | Curt et al. |
| 2011/0260413 A1 | 10/2011 | Voltenburg et al. |
| 2011/0303604 A1 | 12/2011 | Mckenzie |
| 2012/0031059 A1 | 2/2012 | Haslebacher |

(56) References Cited

U.S. PATENT DOCUMENTS

| | | |
|---|---|---|
| 2012/0055127 A1 | 3/2012 | Holzmann et al. |
| 2012/0061307 A1 | 3/2012 | Kindkeppel et al. |
| 2012/0067013 A1 | 3/2012 | Antony et al. |
| 2012/0223008 A1 | 9/2012 | Mbadinga-Mouanda et al. |
| 2013/0015119 A1 | 1/2013 | Pugh et al. |
| 2013/0033006 A1 | 2/2013 | Salvador et al. |
| 2013/0087497 A1 | 4/2013 | Wells et al. |
| 2013/0220914 A1 | 8/2013 | Hawkins et al. |
| 2013/0291502 A1 | 11/2013 | Gorman |
| 2013/0327696 A1 | 12/2013 | Bagci et al. |
| 2014/0027366 A1 | 1/2014 | Hawkins et al. |
| 2014/0034565 A1 | 2/2014 | Loken et al. |
| 2014/0034566 A1 | 2/2014 | Verdegan et al. |
| 2014/0048468 A1 | 2/2014 | Kindkeppel et al. |
| 2014/0071669 A1 | 3/2014 | Mccarthy et al. |
| 2014/0096493 A1 | 4/2014 | Kelmartin et al. |
| 2014/0151275 A1 | 6/2014 | Bradford et al. |
| 2014/0190880 A1 | 7/2014 | Krull |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1* | 10/2014 | Rieger ............... B01D 46/10 55/495 |
| 2014/0366494 A1 | 12/2014 | Ardes |
| 2015/0013288 A1 | 1/2015 | Hasenfratz et al. |
| 2015/0013289 A1 | 1/2015 | Hasenfratz et al. |
| 2015/0013293 A1 | 1/2015 | Wagner et al. |
| 2015/0033684 A1 | 2/2015 | Pettersson |
| 2015/0060351 A1 | 3/2015 | Kaufmann et al. |
| 2015/0061307 A1 | 3/2015 | Nakanishi |
| 2015/0090651 A1 | 4/2015 | Kotale et al. |
| 2015/0090656 A1 | 4/2015 | Mandt et al. |
| 2015/0096273 A1 | 4/2015 | Kaiser |
| 2015/0096932 A1 | 4/2015 | Hou et al. |
| 2015/0101295 A1 | 4/2015 | Thompson et al. |
| 2015/0107201 A1 | 4/2015 | Cornaglia |
| 2015/0176544 A1 | 6/2015 | Kaufmann et al. |
| 2015/0202556 A1 | 7/2015 | Hawkins et al. |
| 2015/0231532 A1 | 8/2015 | Pugh et al. |
| 2015/0285381 A1 | 10/2015 | Preston et al. |
| 2016/0023142 A1 | 1/2016 | Arakeri et al. |
| 2016/0045848 A1 | 2/2016 | Campbell et al. |
| 2016/0059172 A1* | 3/2016 | Allott ............... B01D 46/0005 55/502 |
| 2016/0082372 A1 | 3/2016 | South et al. |
| 2016/0160816 A1 | 6/2016 | Venkatraman et al. |
| 2016/0169391 A1 | 6/2016 | Emig et al. |
| 2016/0220931 A1 | 8/2016 | Ardes |
| 2016/0222931 A1 | 8/2016 | Jiang et al. |
| 2016/0228798 A1 | 8/2016 | Page et al. |
| 2016/0258397 A1 | 9/2016 | Jiang et al. |
| 2016/0332098 A1 | 11/2016 | Chavan et al. |
| 2016/0332103 A1 | 11/2016 | Marks et al. |
| 2017/0014738 A1 | 1/2017 | Malgorn et al. |
| 2017/0078852 A1 | 3/2017 | Tan et al. |
| 2018/0318745 A1 | 11/2018 | Nichols et al. |
| 2020/0324237 A1 | 10/2020 | Moers et al. |
| 2021/0129049 A1 | 5/2021 | Yesane et al. |
| 2021/0275954 A1 | 9/2021 | Malgorn |
| 2022/0047971 A1 | 2/2022 | Abdalla et al. |
| 2022/0339560 A1 | 10/2022 | Glazewski et al. |
| 2022/0379245 A1 | 12/2022 | Oren et al. |
| 2023/0166208 A1 | 6/2023 | Decugniere |

FOREIGN PATENT DOCUMENTS

| | | |
|---|---|---|
| CN | 1139884 A | 1/1997 |
| CN | 1193288 A | 9/1998 |
| CN | 2296402 Y | 11/1998 |
| CN | 1486213 A | 3/2004 |
| CN | 1590746 B | 3/2005 |
| CN | 2372041 Y | 4/2005 |
| CN | 1754612 A | 4/2006 |
| CN | 101022877 A | 8/2007 |
| CN | 101084050 A | 12/2007 |
| CN | 101184544 B | 5/2008 |
| CN | 101374582 A | 2/2009 |
| CN | 201292900 Y | 8/2009 |
| CN | 101695616 A | 4/2010 |
| CN | 201696412 A | 1/2011 |
| CN | 102046259 A | 5/2011 |
| CN | 102083510 A | 6/2011 |
| CN | 202040173 U | 11/2011 |
| CN | 102271780 A | 12/2011 |
| CN | 202746046 U | 2/2013 |
| CN | 103501873 A | 1/2014 |
| CN | 103648608 | 3/2014 |
| CN | 103977647 A | 8/2014 |
| CN | 104028060 | 9/2014 |
| CN | 104220142 A | 12/2014 |
| CN | 105658944 A | 6/2016 |
| CN | 105688498 A | 6/2016 |
| CN | 105899271 A | 8/2016 |
| CN | 106102858 A | 11/2016 |
| CN | 110382075 A | 10/2019 |
| CN | 110418675 A | 11/2019 |
| CN | 112334209 A | 2/2021 |
| CN | 112469487 A | 3/2021 |
| CN | 109414639 B | 9/2022 |
| DE | 88 08 632 U1 | 9/1988 |
| DE | 29613098 U1 | 9/1996 |
| DE | 20 2004 014 559 U1 | 1/2005 |
| DE | 10 2008 062 956 A1 | 6/2010 |
| DE | 10 2014 102 794 B4 | 5/2018 |
| DE | 11 2018 000 343 T5 | 9/2019 |
| DE | 20 2020 104 741 U1 | 1/2021 |
| DE | 11 2019 003 046 T5 | 3/2021 |
| DE | 11 2006 001 365 B4 | 4/2021 |
| EP | 0 718 021 A1 | 6/1996 |
| EP | 0 747 579 A2 | 12/1996 |
| EP | 0 982 062 A2 | 3/2000 |
| EP | 1 129 760 A2 | 9/2001 |
| EP | 1 166 843 A1 | 1/2002 |
| EP | 1 208 902 A1 | 5/2002 |
| EP | 1 233 173 A2 | 8/2002 |
| EP | 1 693 096 A2 | 8/2006 |
| EP | 1 693 096 B1 | 8/2006 |
| EP | 1 747 053 A1 | 1/2007 |
| EP | 3 370 849 A1 | 9/2018 |
| EP | 3 528 920 A1 | 8/2019 |
| EP | 4 122 576 A1 | 1/2023 |
| FR | 2214505 A1 | 8/1974 |
| FR | 3018202 B1 | 12/2021 |
| FR | 3057177 B1 | 4/2022 |
| GB | 0 970 826 A | 9/1964 |
| GB | 2 082 932 A | 3/1982 |
| GB | 2 404 348 A | 2/2005 |
| JP | 60-112320 A | 6/1985 |
| JP | 01-163408 A | 6/1989 |
| JP | 01-171615 A | 7/1989 |
| JP | 02-025009 A | 1/1990 |
| MX | 2019008240 A | 7/2019 |
| MX | 2019010714 A | 9/2019 |
| MX | 2020013448 A | 12/2020 |
| WO | WO-97/16235 | 5/1997 |
| WO | WO-00/50152 A1 | 8/2000 |
| WO | WO-00/74818 A1 | 12/2000 |
| WO | WO-01/05485 A1 | 1/2001 |
| WO | WO-2004/054684 A1 | 7/2004 |
| WO | WO-2005/058461 A1 | 6/2005 |
| WO | WO-2005/077487 A1 | 8/2005 |
| WO | WO-2006/093981 A2 | 9/2006 |
| WO | WO-2007/009039 A1 | 1/2007 |
| WO | WO-2007/089662 A2 | 8/2007 |
| WO | WO-2012/153430 A1 | 11/2012 |
| WO | WO-2014/111162 A1 | 7/2014 |
| WO | WO-2017/079191 A1 | 5/2017 |
| WO | WO-2017/120113 A1 | 7/2017 |
| WO | WO-2017/180875 A1 | 10/2017 |
| WO | WO-2018/075063 A1 | 4/2018 |
| WO | WO-2018/156489 A1 | 8/2018 |

(56) References Cited

FOREIGN PATENT DOCUMENTS

WO    WO-2018/175438 A1    9/2018
WO    WO-2022/150130       7/2022

OTHER PUBLICATIONS

Final Office Action on U.S. Appl. No. 16/097,773 Dtd Dec. 14, 2020.
Final Office Action on U.S. Appl. No. 16/153,977 Dtd May 11, 2021.
First Examination Report for Indian Patent App. No. 202047056950 dated Mar. 24, 2021, 5 pages.
First Examination Report for Indian Patent App. No. 3035/KOLNP/2011, dated Feb. 8, 2019, 7 pages.
First Office Action for Chinese Patent App. No. 201080004417.5, dated May 24, 2013, 13 pages (with translation).
First Office Action for Chinese Patent App. No. 2016800710703 dated Nov. 26, 2019, 29 pages (with translation).
First Office Action for Chinese Patent App. No. 201880012627.5 dated Dec. 12, 2020, 22 pages (with English translation).
First Office Action for Chinese Patent Application No. 201880007980.4 dated Jan. 12, 2021, 15 pages (with English translation).
First Office Action issued for Chinese Patent App. No. 201880018033.5 issued Dec. 24, 2020, 10 pages (with English translation).
First Office Action on MX Patent Application No. MX/a/2018/013103 Dtd Jul. 25, 2022 (4 pages) (no English Translation).
Foreign Action other than Search Report on CN Dtd Nov. 9, 2022.
Foreign Action other than Search Report on CN 2016800710703 Dtd Dec. 7, 2020.
Foreign Action other than Search Report on CN 2017800167069 Dtd Apr. 25, 2021.
Foreign Action other than Search Report on CN 2017800167069 Dtd May 28, 2020.
Foreign Action other than Search Report on CN 201880018033.5 Dtd Jan. 26, 2022.
Foreign Action other than Search Report on CN 201880018033.5 Dtd Jul. 7, 2021.
Foreign Action other than Search Report on IN 201947035987 Dtd Aug. 19, 2020.
Foreign Action other than Search Report on Mx Dtd Nov. 7, 2022.
International Search Report & Written Opinion for PCT/US2010/024765 dated Apr. 7, 2010, 9 pages.
International Search Report & Written Opinion for PCT/US2018/014401 dated May 15, 2018, 9 pages.
International Search Report & Written Opinion for PCT/US2018/018724 dated Apr. 24, 2018, 13 pages.
International Search Report and Written Opinion for PCT/IB2019/056208 dated Nov. 11, 2019, 8 pages.
International Search Report and Written Opinion for PCT/US2016/063053, dated Feb. 16, 2017, 8 pages.
International Search Report and Written Opinion for PCT/US2017/021615, dated Jun. 6, 2017, 8 pages.
International Search Report and Written Opinion for PCT/US2017/030386, dated Jul. 26, 2017, 9 pages.
International Search Report and Written Opinion for PCT/US2018/018696, dated Apr. 19, 2018, 8 pages.
Non-Final Office Action from U.S. Appl. No. 15/781,585, dated Jul. 2, 2020.
Non-Final Office Action from U.S. Appl. No. 16/097,773, dated Jul. 14, 2020.
Non-Final Office Action on U.S. Appl. No. 16/487,209 Dtd May 28, 2021.
Non-Final Office Action on U.S. Appl. No. 16/493,511 Dtd Jul. 1, 2021.
Non-Final Office Action on U.S. Appl. No. 17/474,306 Dtd Oct. 6, 2022.
Notice of Allowance issued for U.S. Appl. No. 15/781,585, issued Feb. 3, 2021, 23 pages.
Notice of Allowance on U.S. Appl. No. 15/706,138 Dtd Jun. 28, 2018.
Notice of Allowance on U.S. Appl. No. 15/706,138 Dtd Jul. 10, 2018.
Notice of Allowance on U.S. Appl. No. 16/097,773 Dtd Feb. 26, 2021.
Notice of Allowance on U.S. Appl. No. 16/097,773 Dtd Jun. 15, 2021.
Notice of Allowance on U.S. Appl. No. 16/153,977 Dtd Aug. 2, 2023.
Notice of Allowance on U.S. Appl. No. 17/474,306 Dtd Feb. 1, 2023.
Office Action for German Patent App. No. 11 2010 001 567.8 dated May 18, 2017, 12 pages (with translation).
Office Action for U.S. Appl. No. 15/236,213 dated Feb. 7, 2017, 9 pages.
Office Action for U.S. Appl. No. 15/236,213 dated Sep. 9, 2016, 10 pages.
Second Office Action for Chinese Patent App. No. 201080004417.5, dated Mar. 5, 2014, 28 pages (with translation).
US Notice of Allowance on U.S. Appl. No. 16/493,511 Dtd Sep. 24, 2021.
US Office Action on U.S. Appl. No. 15/781,585 Dtd Nov. 5, 2020.
CN Decision of Rejection on CN 201880012627.5 Dtd Apr. 12, 2022.
Examination Report for EP 22196095.8 issued Sep. 20, 2024.
Extended European Search Report issued for European Patent Application No. EP 22196095.8 issued Dec. 13, 2022, 7 pages.
Final Office Action on U.S. Appl. No. 16/487,209 Dtd Jun. 20, 2022.
First Office Action issued for Chinese Patent Application No. 202180013535.0 issued Feb. 7, 2024, 9 pages.
First Office Action issued for Chinese Patent Application No. CN 201980048336.6 issued Oct. 29, 2021, 9 pages.
International Search Report and Written Opinion issued for PCT Application No. PCT/US2021/017197 issued Jun. 25, 2021, 16 pages.
Non-Final Office Action for U.S. Appl. No. 16/478,092, dated Jul. 30, 2021.
Non-Final Office Action issued for U.S. Appl. No. 18/196,550 issued Sep. 12, 2024, 63 pages.
Non-Final Office Action on U.S. Appl. No. 16/487,209 issued Oct. 18, 2022.
Notice of Allowance on U.S. Appl. No. 16/487,209 issued Mar. 23, 2023.
Office Action issued for Chinese Patent Application No. CN 201880007980.4 issued Jul. 9, 2021, 7 pages.
Third Office Action issued for Chinese Patent No. 201980048336.6 issued Nov. 3, 2022, 10 pages.

* cited by examiner

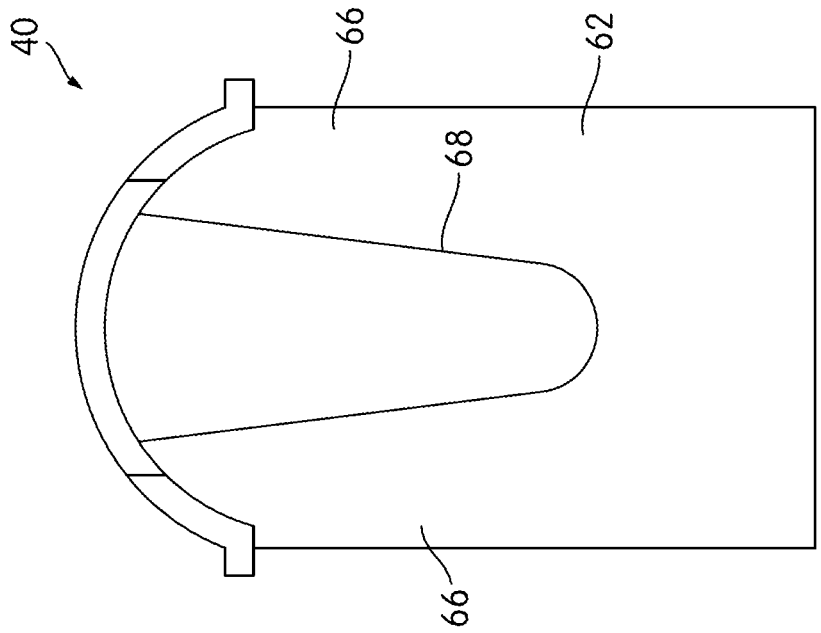
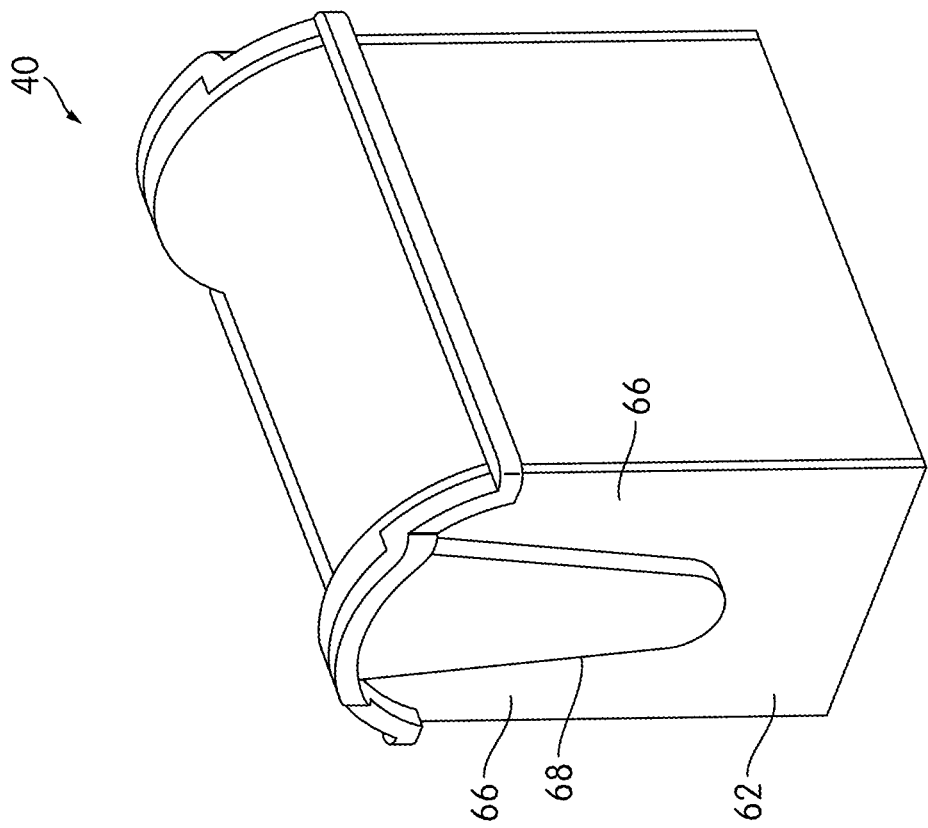
FIG. 7B
FIG. 7A

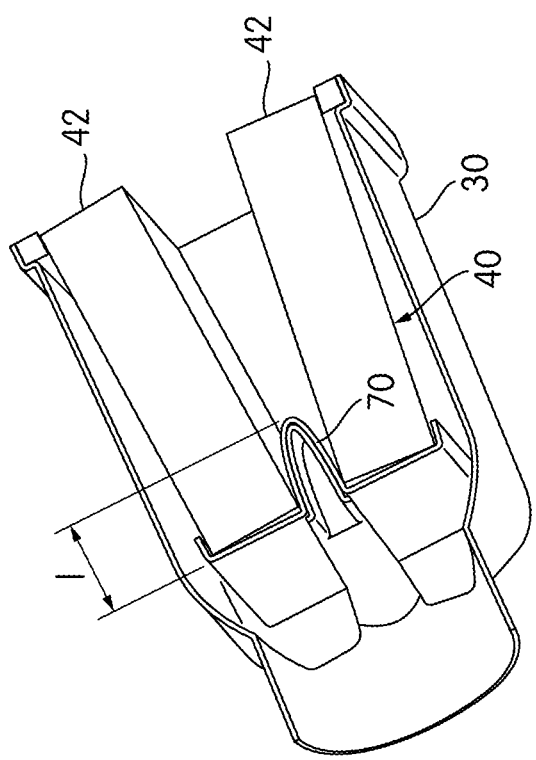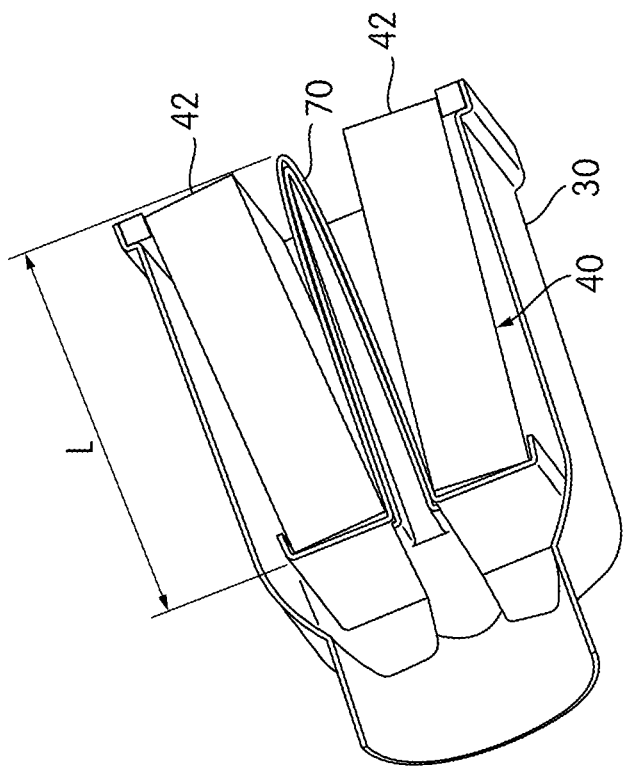
FIG. 10A
FIG. 10B

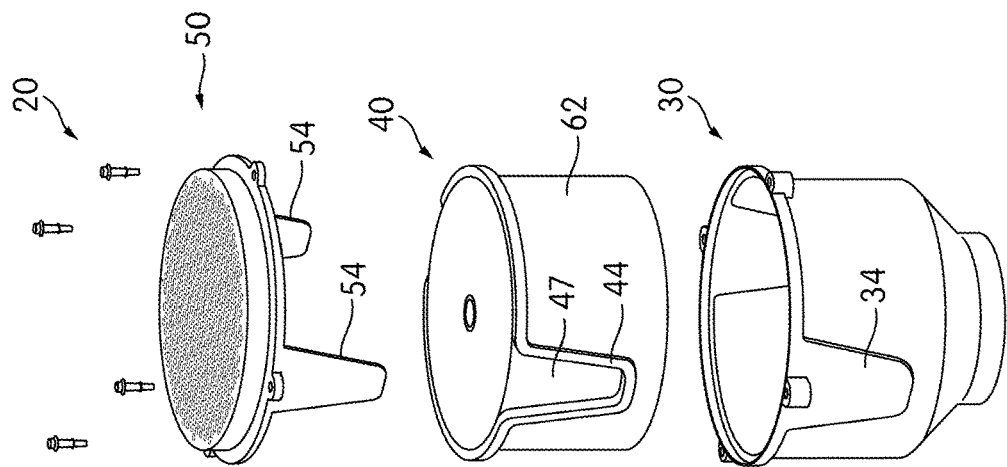
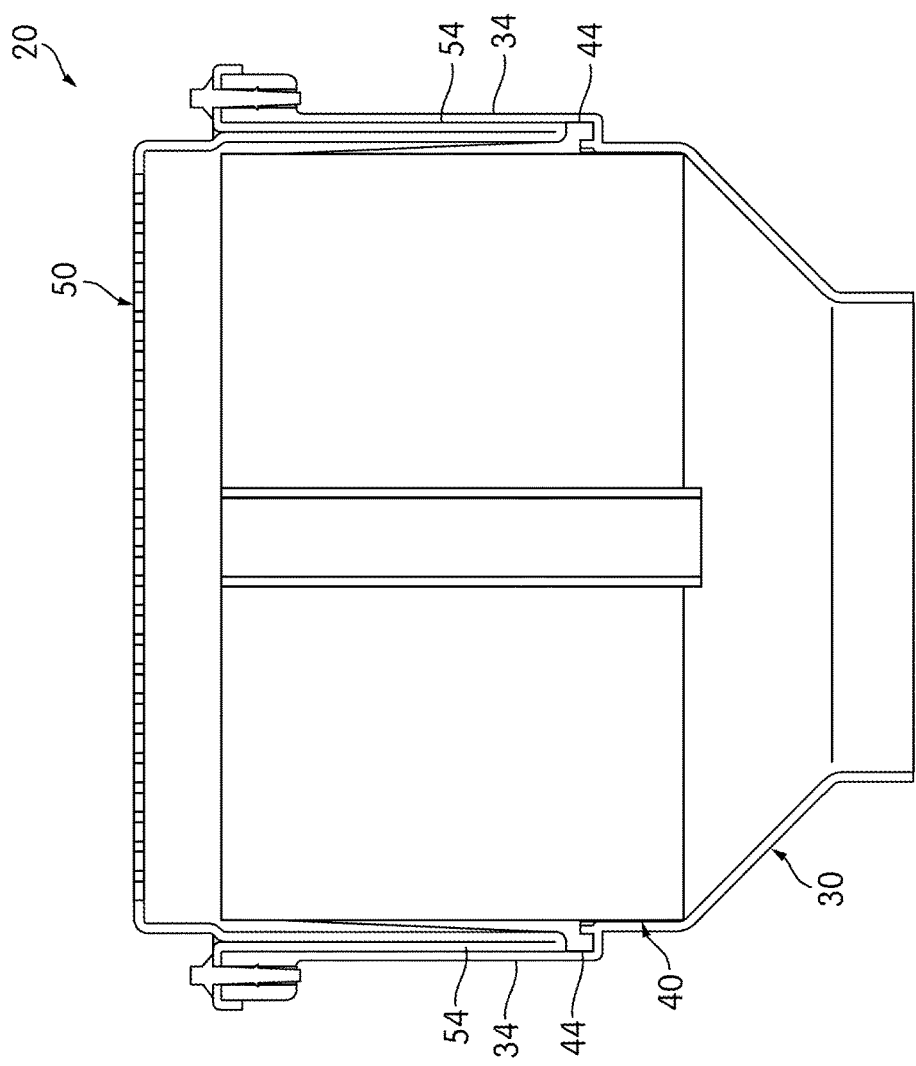
FIG. 18B
FIG. 18A

INTERLOCKED STABLE FILTER ASSEMBLY

CROSS-REFERENCE TO RELATED PATENT APPLICATIONS

This application is a continuation of U.S. patent application Ser. No. 17/516,431, filed Nov. 1, 2021, which is a divisional of U.S. application Ser. No. 16/083,945, filed Sep. 11, 2018, now U.S. Pat. No. 11,167,234, which is a National Phase of PCT Application No. PCT/US2017/021615, filed Mar. 9, 2017, and which claimed the benefit of U.S. Provisional Patent Application No. 62/310,330, filed Mar. 18, 2016. The contents of these applications are incorporated herein by reference in their entirety.

FIELD

The present invention relates generally to air filtration systems for use with internal combustion engines or the like.

BACKGROUND

A number of conventional filtration systems have used a seal with an elastomeric material positioned in an axial compressive or radial compressive configuration along an entire inner circumference of filter housing of the filtration system. This arrangement allows the mass of the filtration system to vibrate freely at the ends of the filter housing. A number of such filtration systems also include a planar seal between the various elements of the filtration system and an expensive plastic endcap. Accordingly, such filtration systems do not have a high stability and are relatively expensive to manufacture.

SUMMARY

Various embodiments provide for a filter assembly that includes a filter housing with a housing interlocking feature, a filter cover with a filter cover interlocking feature, and a filter element with a filter element interlocking feature is disclosed. The filter element is positionable within the filter housing, and the filter cover is attachable to a top portion of at least one of the filter element and the filter housing. The housing interlocking feature, the filter cover interlocking feature, and the filter element interlocking feature are interlockable with each other and extend in a nonplanar configuration along at least one side of the filter element when the filter housing, the filter cover, and the filter element are assembled together.

Other embodiments provide for a filter assembly that includes a filter housing with a receptacle that is recessed within an inner side of a side wall of the filter housing and a filter element with a protruding portion that extends from an outer side of a side wall of the filter element. The protruding portion insertable into the receptacle when the filter element is positioned within the filter housing.

Still other embodiments provide for a filter assembly that includes a filter housing, a filter cover, a filter element positionable within the filter housing, and an inner locking feature positioned within the filter housing. The filter cover is attachable to a top portion of at least one of the filter element and/or the filter housing. The inner locking feature is interlockable with the filter element such that the filter element remains in place within the filter housing.

Other embodiments provide for a filter element that includes a filter media, and a filter element interlocking feature that extends in a nonplanar configuration along at least one side of the filter media. The filter element is positionable within a filter housing such that the filter element interlocking feature interlocks with a housing interlocking feature of the filter housing.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 7A is a perspective view of a filter element that can be disposed in the filter assembly of FIG. 6A according to one embodiment.

FIG. 7B is a front view of the filter element of FIG. 7A.

FIG. 10A is a cross-sectional, perspective view of a filter element and a filter housing according to yet another embodiment.

FIG. 10B is a cross-sectional, perspective view of a filter element and a filter housing according to still another embodiment.

FIG. 18A is a cross-sectional view of a filter assembly according to yet another embodiment.

FIG. 18B is an exploded view of the filter assembly of FIG. 18A.

DETAILED DESCRIPTION

Referring to the figures generally, the various embodiments disclosed herein relate to a filter assembly, such as an air filter assembly, that includes a filter housing, a filter cover, and a filter element. The filter element may be removably positioned within the filter housing, and the filter cover may form a seal with or secure the filter element within the filter housing. The filter assembly includes interlocking features and/or an inner locking feature, as described further herein.

The Filter Assembly

Figure 1B:
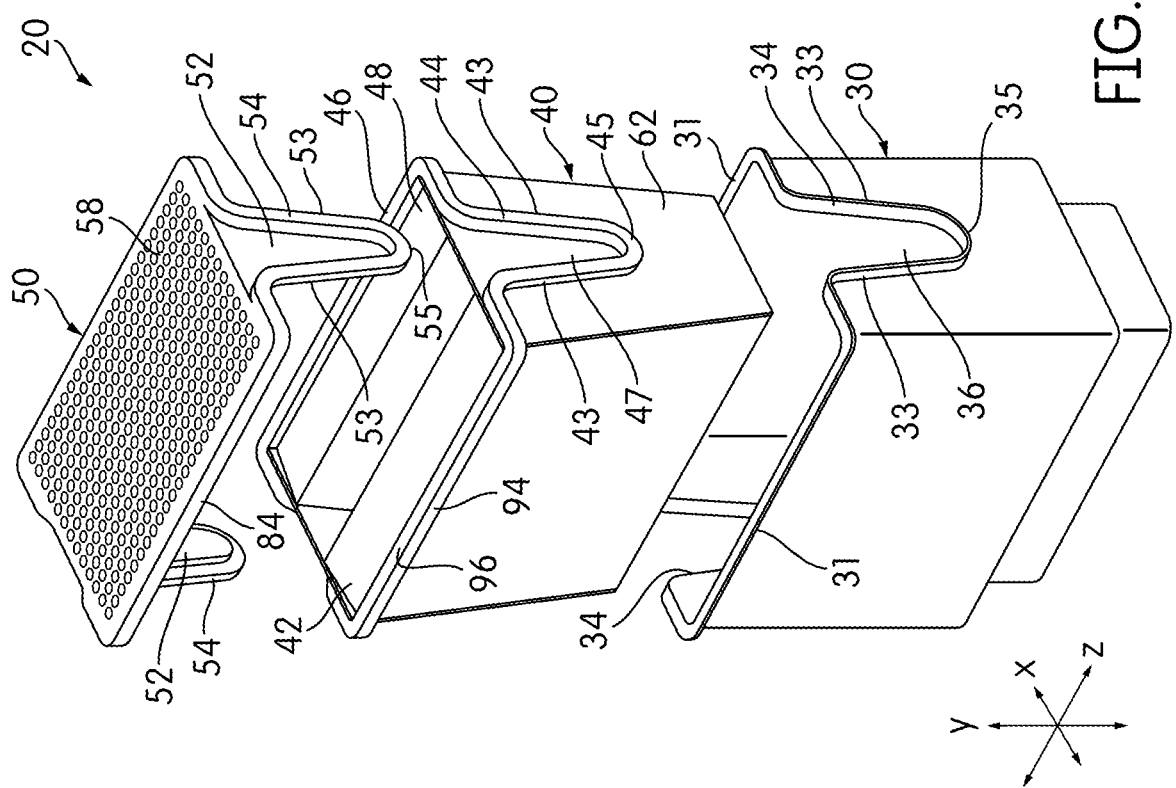
FIG. 1B is an exploded perspective view of the filter assembly of FIG. 1A.
Figure 1A:
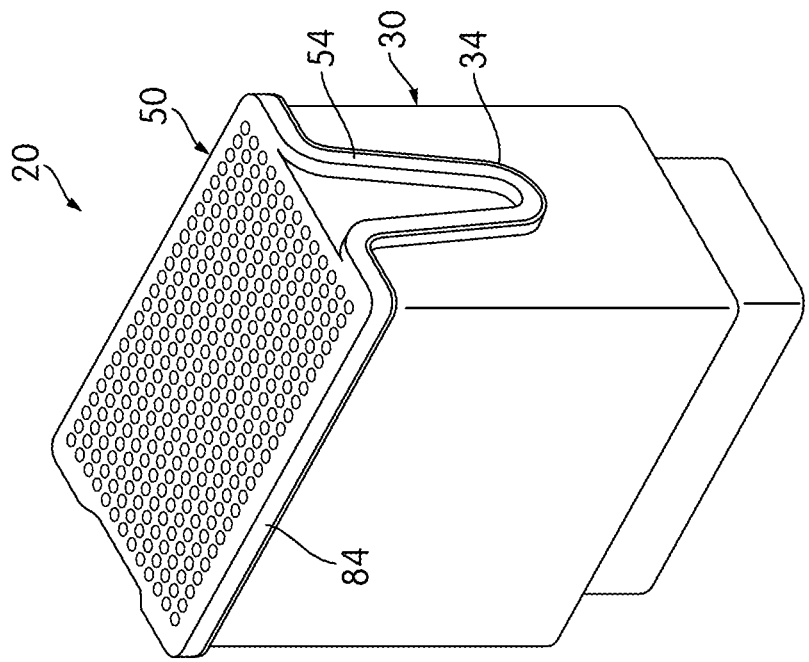
FIG. 1A is a perspective view of a filter assembly according to one embodiment.

As shown in FIGS. 1A-1B, a filter assembly 20 includes a filter housing 30, a filter element 40, and a filter cover 50 which interlock together to form the filter assembly 20. As described further herein, each of the housing interlocking feature 34, the filter element interlocking feature 44, and the filter cover interlocking feature 54 of the filter housing 30, the filter element 40, and the filter cover 50, respectively, interlock with each other to create a robust seal within the filter assembly 20.

Figure 15:
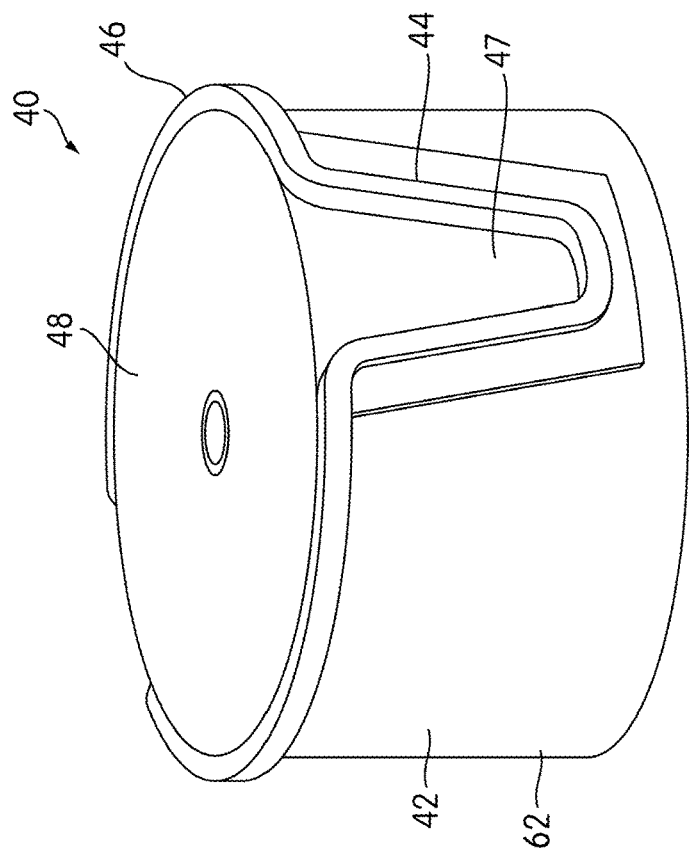
FIG. 15 is a perspective view of a filter element according to still another embodiment.
Figure 14:
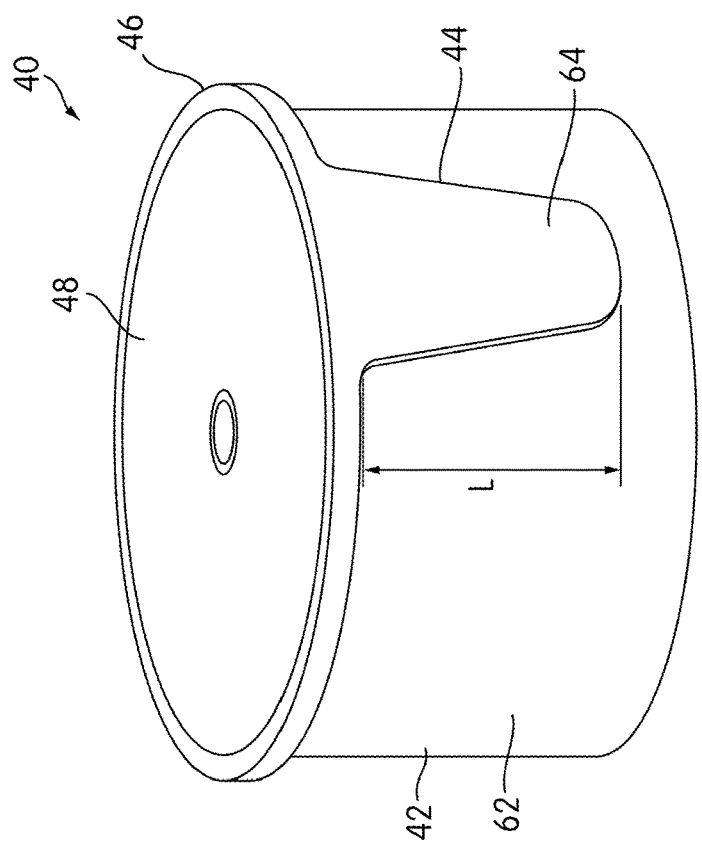
FIG. 14 is a perspective view of a filter element according to yet another embodiment.

FIGS. 11A-11D show another embodiment of a filter assembly 20 that also includes a filter housing 30, a filter element 40, and a filter cover 50. The features shown in FIGS. 11A-11D are substantially identical and like numbers are used compared to the embodiment shown in FIGS. 1A-1B. However, the embodiment shown in FIGS. 11A-11D differs from the embodiment in FIGS. 1A-1B in that the cross-section of the filter assembly in FIGS. 11A-11D is substantially round or circular, while the cross-section of the filter assembly in FIGS. 1A-1B is substantially rectangular. FIGS. 14 and 15 also show an embodiment of a filter element 40 that has a circular cross-section, and FIGS. 18A-20B show another embodiment of a filter assembly 20 with a circular cross-section.

The filter assembly 20 and its various components can have a variety of different shapes, according to the desired use and configuration. For example, in the embodiment shown in FIGS. 1A-1B, the filter assembly 20 (and the filter housing 30, the filter element 40, and the filter cover 50) have a substantially rectangular cross-section. Each of the filter housing 30, the filter element 40, and the filter cover 50 of the filter assembly 20 accordingly have corresponding shapes in order to fit with each other. In the embodiment shown in FIGS. 11A-11D, on the other hand, the filter assembly 20 (and the filter housing 30, the filter element 40, and the filter cover 50) are substantially cylindrical (e.g., have a substantially circular cross-section). However, it is also understood that the filter assembly 20 can possess a variety of other shapes. For example, the filter assembly 20 can have a cross-section that is substantially oval, triangular, race-track or any other shape. Regardless of the overall shape of the filter assembly 20, the filter assembly 20 still includes the various interlocking features (as described further herein).

Figure 11B:
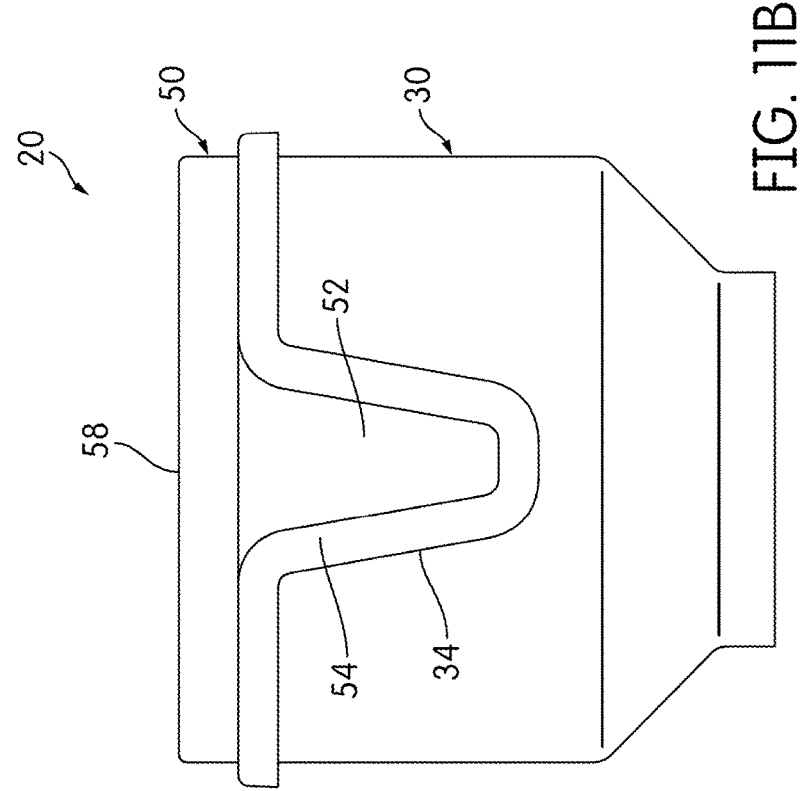
FIG. 11B is a side view of the filter assembly of FIG. 11A.
Figure 11A:
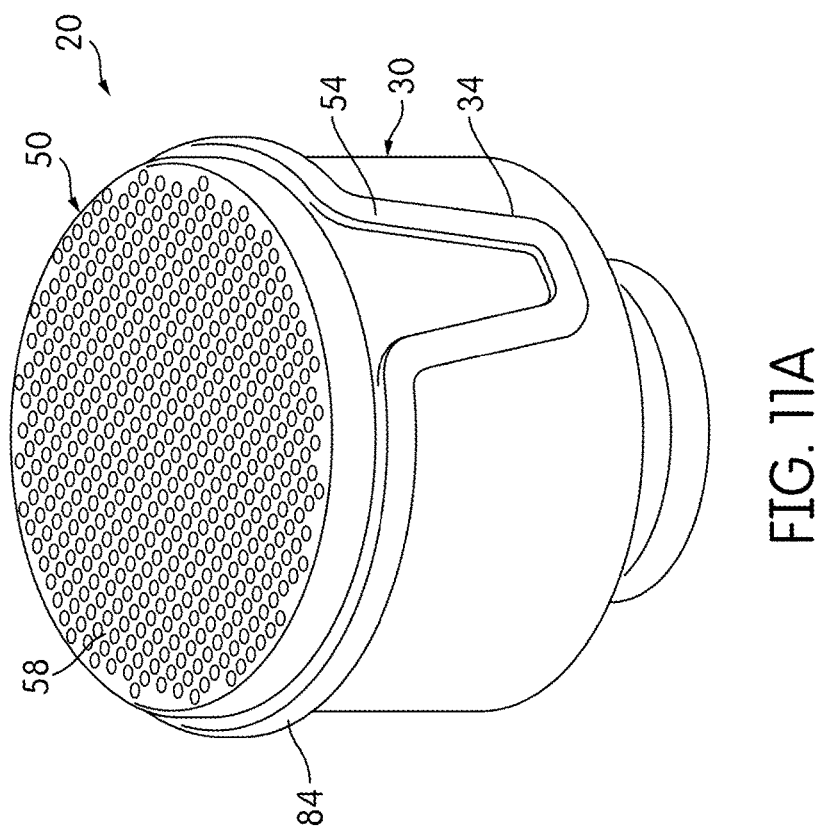
FIG. 11A is a perspective view of a filter assembly according to another embodiment.
Figures 11C, 11D:
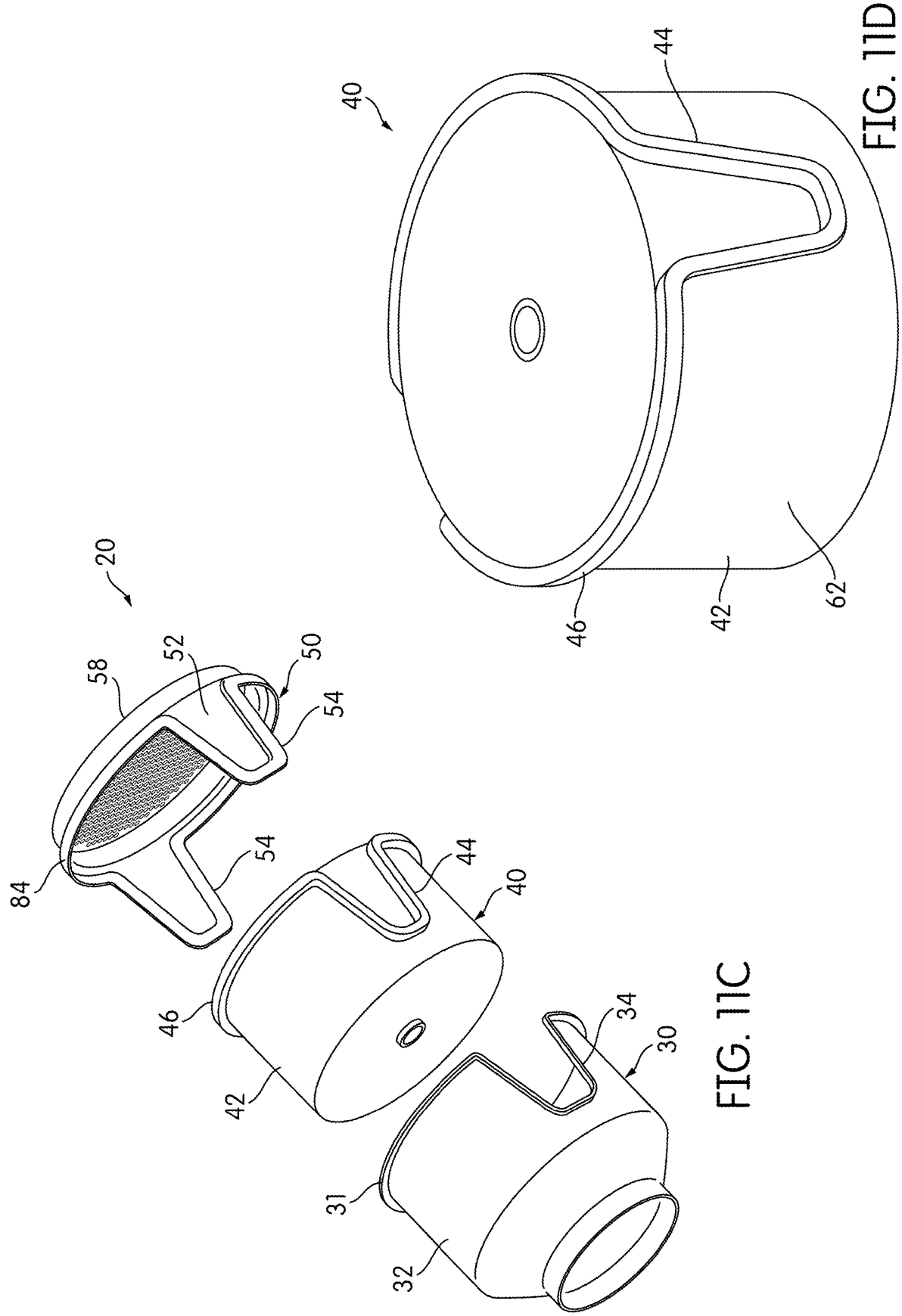
FIG. 11C is an exploded perspective view of the filter assembly of FIG. 11A.
FIG. 11D is a perspective view of a filter element that can be disposed in the filter assembly of FIG. 11A.
Figure 13:
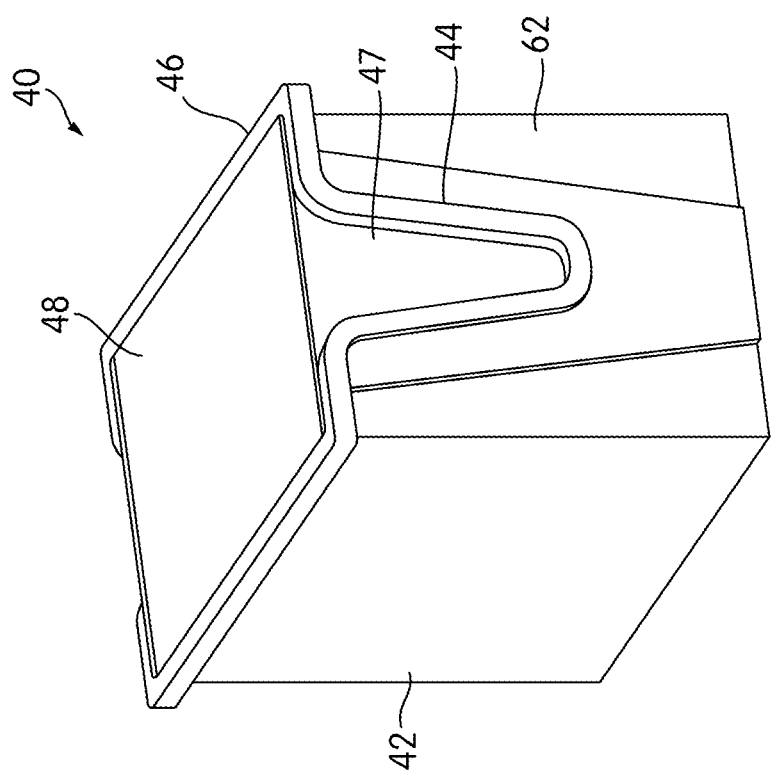
FIG. 13 is a perspective view of a filter element according to another embodiment.

Depending on the overall shape of the filter assembly 20 (i.e., the filter housing 30, the filter element 40, and the filter cover 50), the various components of the filter assembly 20 may be a part of different arrangements. For example, if the cross-section of the filter assembly 20 is substantially rectangular (as shown in FIG. 1B), the side wall 32 of the filter housing 30, the side wall 62 of the filter element 40, and the side wall 52 of the filter cover 50 extend along respective end walls of the filter housing 30, the filter element 40, and the filter cover 50. If the cross-section of the filter assembly 20 is substantially circular (as shown in FIG. 11C), the side wall 32 of the filter housing 30, the side wall 62 of the filter element 40, and the side wall 52 of the filter cover 50 extend along a respective circumferential wall that extends at least partially around the respective perimeter of the filter housing 30, the filter element 40, and the filter cover 50.

The Filter Housing

The filter housing 30 is configured to at least partially contain the filter element 40. Accordingly, the filter housing 30 at least partially surrounds the filter element 40, and the filter cover 50 covers the remaining portions of the filter element 40. As described further herein, the filter housing 30 may include a housing inner locking or interlocking feature 34 that interlocks with the filter element interlocking feature 44 of the filter element 40 and/or the filter cover interlocking feature 54 of the filter cover 50 to form a seal between the filter assembly elements and hold the filter assembly 20 together.

The Filter Cover

The service or filter cover 50 may engage, interlock with, or form a seal with the filter housing 30 in order to secure the filter element 40 within the filter housing 30 and to help stabilize the filter seal member 46 under environments that induce harsh vibration or jerking of the filter assembly 20. By allowing the filter cover 50 to interlock with the filter housing 30, the filter cover 50 helps reduce the stress load on the filter seal member 46 and reduces abrasion on the filter seal member 46.

According to one embodiment shown in FIG. 1B, the filter cover 50 includes a top portion 58 and side walls 52 that extend substantially perpendicularly to the top portion 58 such that the top portion 58 and the side walls 52 cover different sides of the filter element 40. The top portion 58 covers a top side of the filter element 40, and the side walls 52 overlap or partially cover the side walls 62 of the filter element 40.

As described further herein, the filter cover 50 may include a cover inner locking or interlocking feature 54 that may interlock with the filter element interlocking feature 44 of the filter element 40 and/or the housing interlocking feature 34 of the filter housing 30 to secure the filter assembly 20 together. The filter cover interlocking feature 54 may extend along the lower edge or outer perimeter of the filter cover 50 (e.g., along both the top portion 58 and side walls 52) to interlock with the filter seal member 46 of the filter element 40.

Figure 3A:
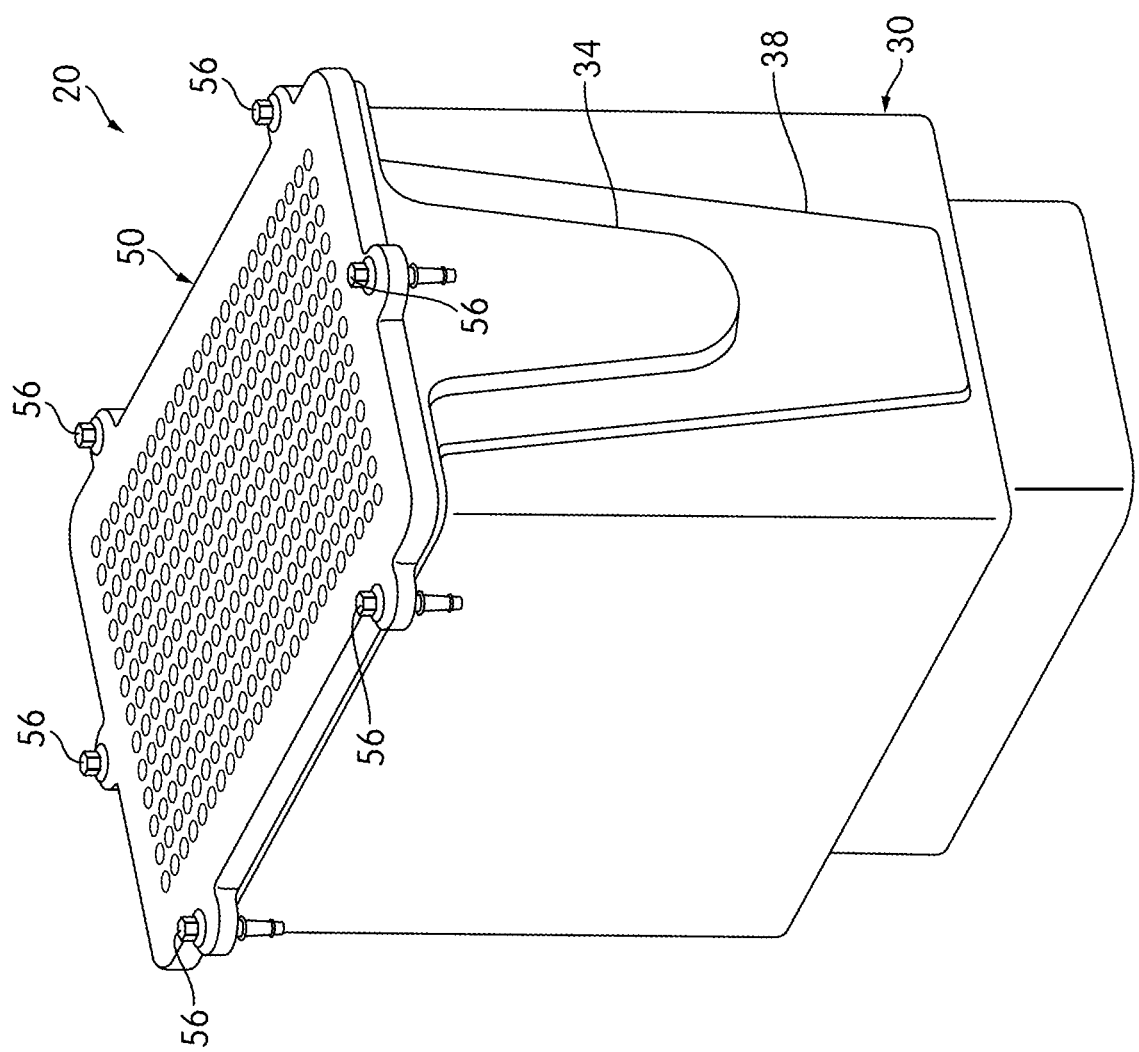
FIG. 3A is a perspective view of a filter assembly according to another embodiment.
Figure 3B:
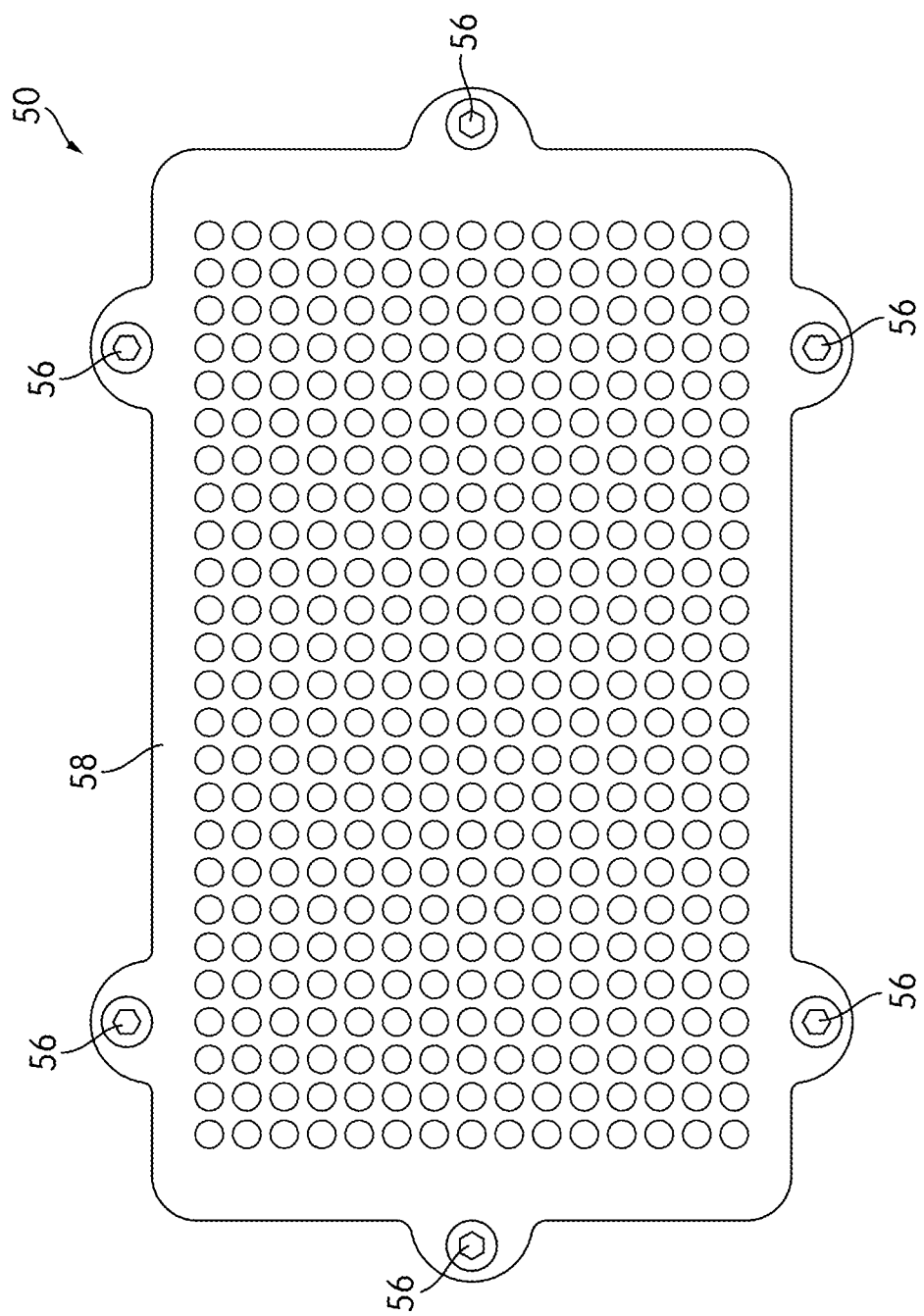
FIG. 3B is a top view of the filter assembly of FIG. 3A.

The filter assembly 20 may optionally include additional sealing mechanisms to further increase the sealing force between the filter housing 30 and the filter cover 50. For example, as shown in FIGS. 3A-3B, the filter cover 50 includes attachment elements 56 along the perimeter of the filter cover 50 that are configured to attach the filter cover 50 to the filter housing 30. The attachment elements 56 may comprise bolted joints, a snap fit elements, or wire form clips and may extend through apertures on the filter cover 50 and the filter housing 30.

Figure 16B:
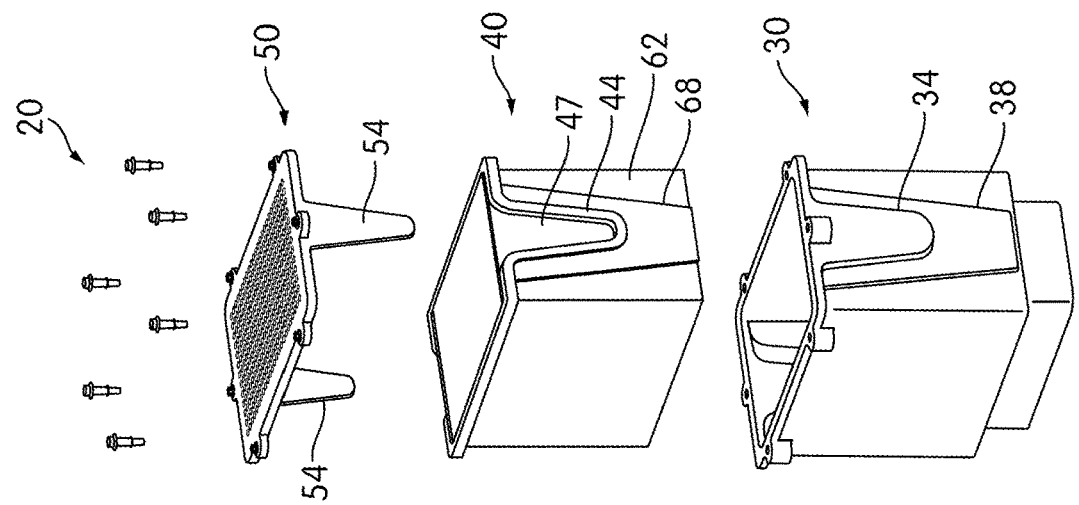
FIG. 16B is an exploded view of the filter assembly of FIG. 16A.
Figure 16A:
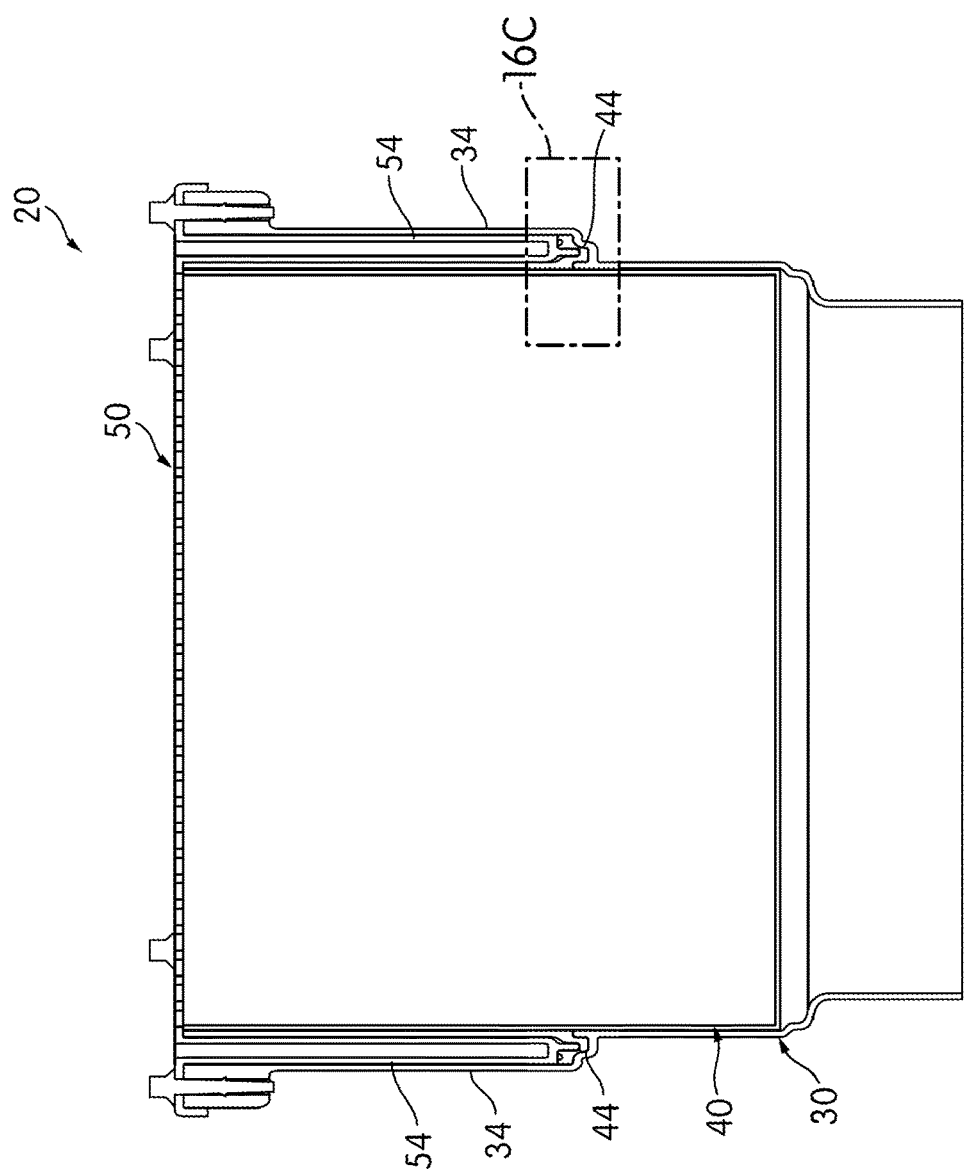
FIG. 16A is a cross-sectional view of a filter assembly according to one embodiment.
Figure 16C:
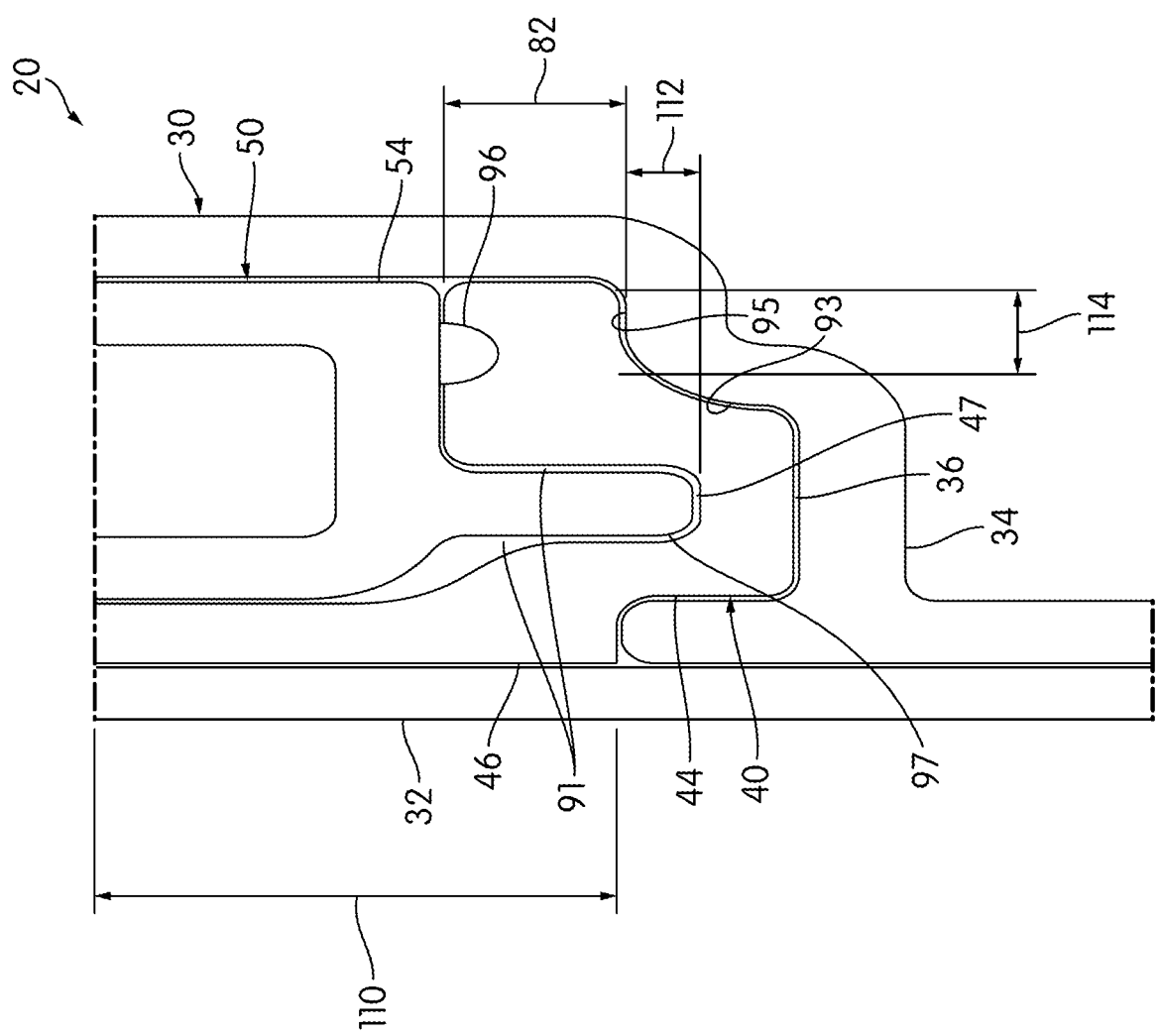
FIG. 16C is a cross-sectional view of a Section 16C of the filter assembly of FIG. 16A.

As shown in FIG. 16C, the filter cover 50 may include a cover interlock tongue 97 to improve the seal formed by the filter seal member 46 and a seal intensifier bead 96 positioned on a bottom region of the cover interlocking feature 54 that may also improve the seal by further compressing the filter seal member 46.

Additionally, as shown in FIGS. 16A-16C and 18A-19B, the cover interlocking feature 54 may fit completely within the housing interlocking feature 34 in order to provide a secure seal. Accordingly, both sides and the bottom of the filter cover interlocking feature 53 may be covered by the housing interlocking feature 34 in order to lock the filter cover 50 to the filter housing 30 and to prevent the filter cover 50 from moving outwards.

The Filter Element

The filter element 40 includes a filter media 42 that is used to filter fluids flowing through the filter assembly 20. Accordingly, the filter element 40 is positioned within the filter housing 30 (e.g., between the filter housing 30 and the filter cover 50, as shown in FIG. 1B). By attaching the filter cover 50 to the filter housing 30, the filter element 40 is incorporated and secured within the housing 30. As described further herein, the filter element 40 may include a filter element inner locking or interlocking feature 44 that may interlock with the filter cover interlocking feature 54 of the filter cover 50 and/or the housing interlocking feature 34 of the filter housing 30 to secure the filter assembly 20 together.

Figure 4A:
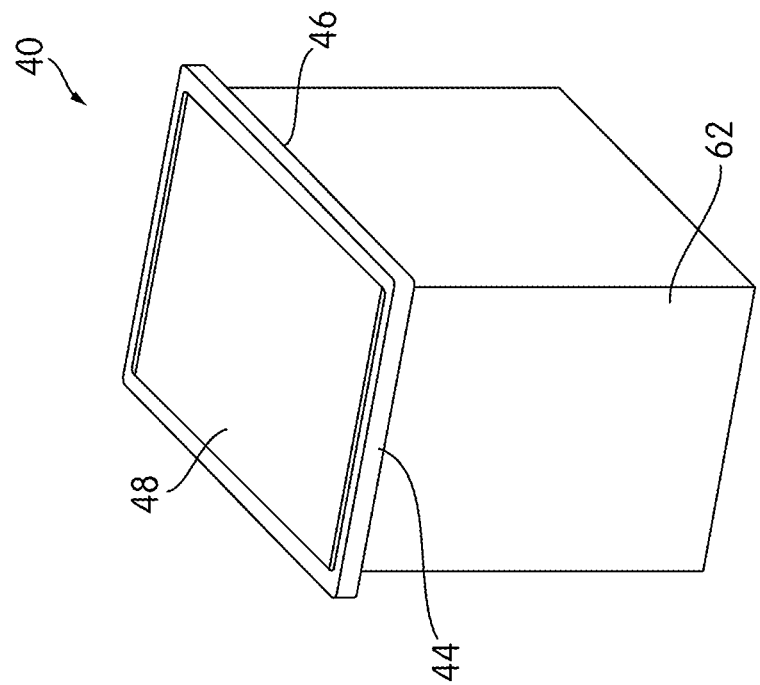
FIG. 4A is a perspective view of a filter element that can be disposed in a filter assembly according to one embodiment.
Figure 4B:
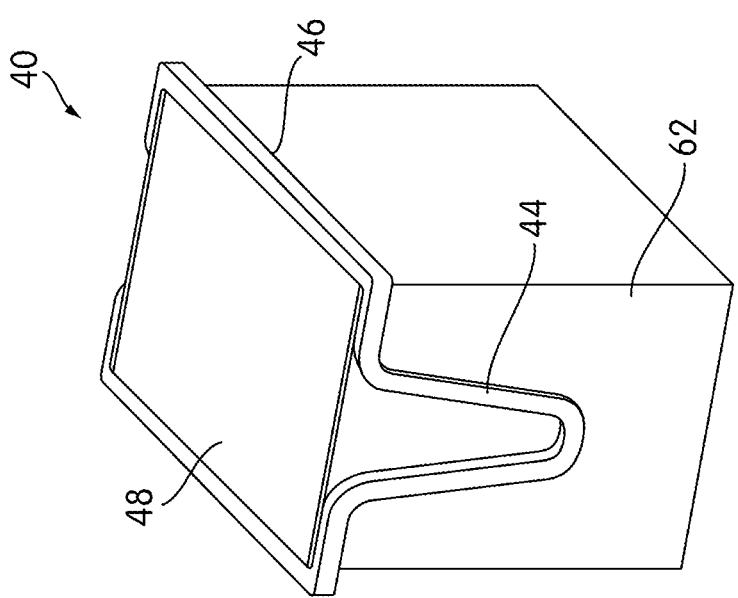
FIG. 4B is a perspective view of a filter element that can be disposed in a filter assembly according to another embodiment.
Figure 5:
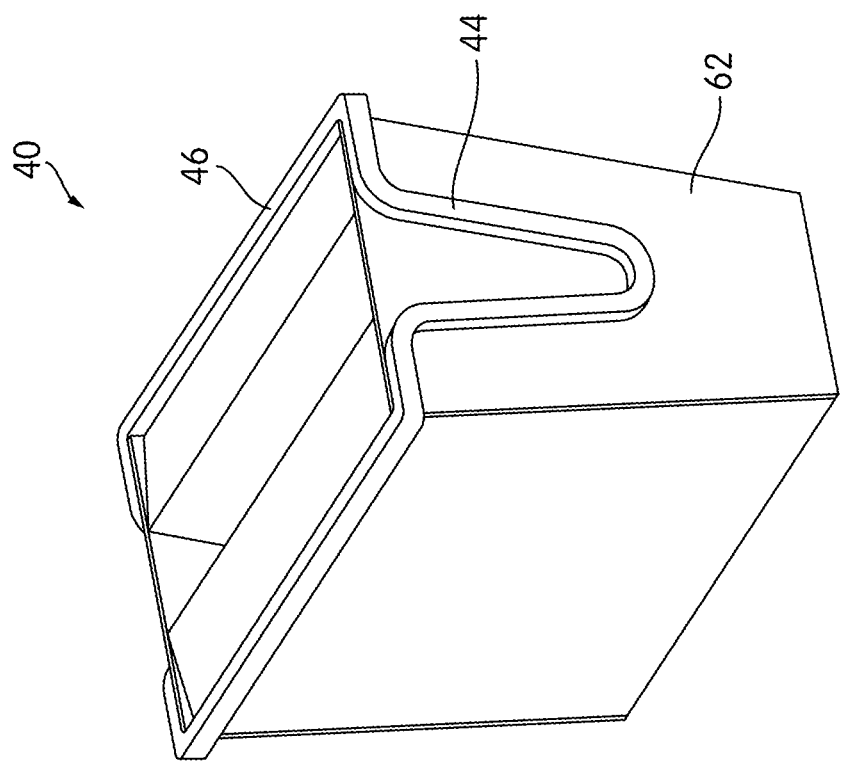
FIG. 5 is a perspective view of a filter element that can be disposed in a filter assembly according to still another embodiment.
Figure 6B:
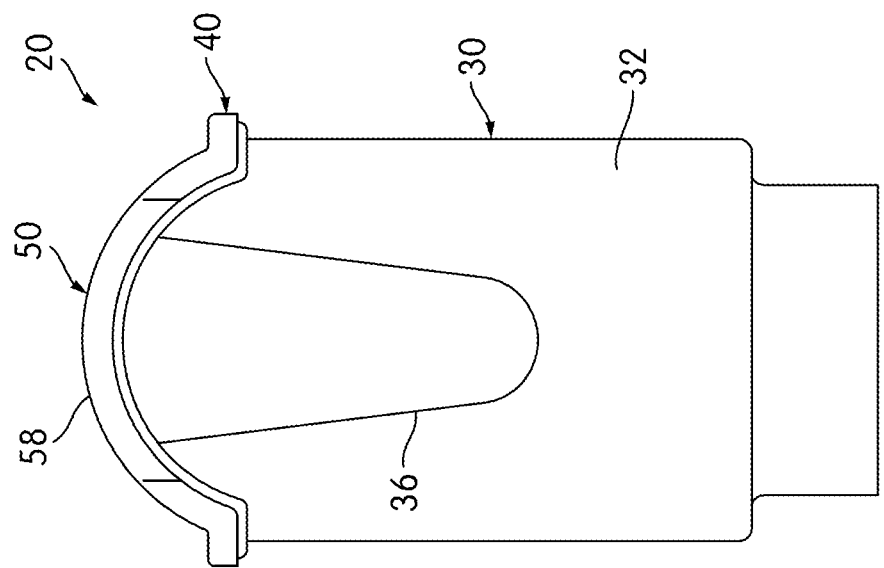
FIG. 6B is a front view of the filter assembly of FIG. 6A.
Figure 6A:
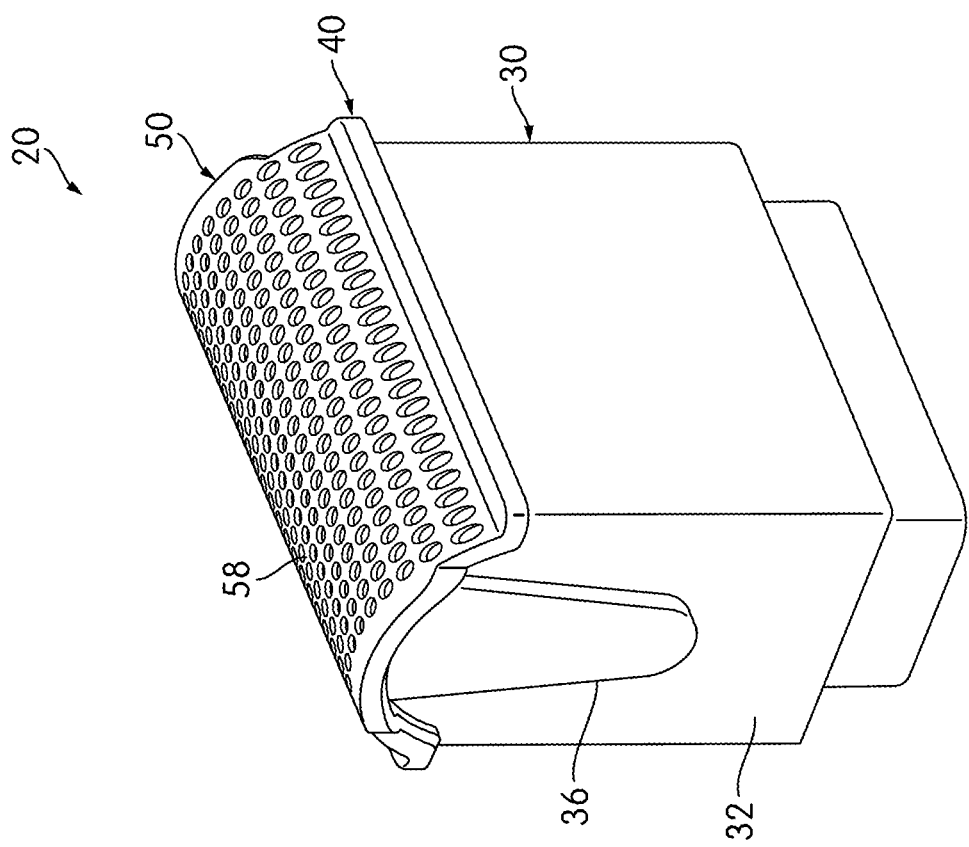
FIG. 6A is a perspective view of a filter assembly according to an embodiment.

The filter element 40 may have a variety of different configurations, depending on the desired type of filtration. For example, the filter element 40 may comprise a coiled filter media in a circular or racetrack shape, panelettes, stacked filter media (as shown in FIGS. 4A-4B), or direct flow V-pack filter media (as shown in FIG. 5). Various different types of filter elements 40 may be interchangeable within the same filter housing 30.

One side or end of the filter element 40, such as the top side of the filter element 40, may define a main seal plane 48 of the filter element 40. The main seal plane 48 is substantially parallel to the x-z plane (as shown in FIG. 1B) and may extend along the top surface of the top portion of the filter element 40. The main seal plane 48 may also be also substantially perpendicular to the side walls 62 of the filter element 40 (although the side walls 62 could also define a non-perpendicular angle to the main seal plane 48). According to one embodiment, the top of the filter element 40 with the main seal plane 48 may correspond to an inlet or an outlet of the filter element 40.

As shown in FIG. 1B, in order to assemble the filter assembly 20, the bottom side of the filter element 40 (e.g., the side that is opposite to the top side of the filter element 40 that defines the main seal plane 48) is inserted into the filter housing 30. The filter cover 50 is then placed on the top side of the filter element 40 such that the top portion 58 of the filter cover 50 extends along (e.g., next to and parallel to) and substantially covers the top side (and thus the main seal plane 48) of the filter element 40. Accordingly, the side walls 52 of the filter cover 50 extend along the side walls 62 of the filter element 40.

As shown in FIGS. 4A-4B, the filter element 40 includes a filter seal member 46 positioned along an outside portion of the filter element 40 and configured to attach with the filter housing 30 and the filter cover 50. In order to hold the filter assembly 20 together, the filter seal member 46 extends around the entire filter element 40 and interfaces with the entire periphery of the filter housing 30 and the entire periphery of the filter cover 50. The filter seal member 46 may be constructed out of a variety of different materials, including but not limited to urethane (such as a solid urethane flexible seal). According to one embodiment, the filter seal member 46 may include the filter element interlocking feature 44 in order to interlock with the filter housing 30 and the filter cover 50. As shown in FIG. 16C, the flexibility of the filter seal member 46 allows the filter element interlocking feature 44 to have a u-shaped cross-section with flexural compliance within the housing cavity 36 of the housing interlocking feature 34.

The filter seal member 46, with the filter element interlocking feature 44, may be configured in a variety of different shapes and may diverge from or correspond with the main seal plane 48. For example, according to one embodiment shown in FIG. 4A, the filter seal member 46 is be non-planar or curviplanar by extending within the main seal plane 48 along at least a portion of the top portion of the filter element 40 and diverging from the main seal plane 48 along certain other portions. Accordingly, when the filter element 40 includes at least two side walls (e.g., having a substantially rectangular cross-section), the filter seal member 46 extends and remains within the main seal plane 48 along the perimeter and upper edge of the filter element 40 of a portion (e.g., along two sides) of the filter element 40. Along at least one of the other two sides of the filter element 40 (e.g., along the side walls 62), the filter seal member 46 diverges away from the main seal plane 48 and extends along at least a portion of the length of an end, end panel, or side wall 62 of the filter element 40, thereby creating the non-planar shape of the filter seal member 46. While the filter element 40 has a substantially circular cross-section, the filter element interlocking feature 44 remains within the main seal plane 48 along a portion of the outer perimeter of the filter element 40 and diverges away from the main seal plane 48 along at least another portion of the outer perimeter of the filter element 40. The portion of the filter seal member 46 that diverges away from the main seal plane 48 and extends along the side wall 62 may be the filter element interlocking feature 44.

According to another embodiment as shown in FIG. 4B, the filter seal member 46 (and the filter element interlocking feature 44) is planar and extends entirely within the main seal plane 48. Accordingly, the filter seal member 46 extends along the entire perimeter or upper edge of one end of the filter element 40 within the main seal plane 48.

According to one embodiment as shown in FIGS. 13, 15, 16B, 18B, and 19B, the region between the filter element interlocking feature 44 and the main seal plane 48 of the filter element 40 defines a filter element cavity 47 that provides an area for the cover interlocking feature 54 to fit within. As shown in FIGS. 16A-16B, 18A-18B, and 19A-19B, the cover interlocking feature 54 is configured to fit within the filter element cavity 47 in order to allow the filter element 40 and the filter cover 50 to seal together. The region below the filter element interlocking feature 44 interlocks with the filter housing 30.

According to another embodiment as shown in FIGS. 12, 14, 17B, and 20B, the filter seal member 46 of the filter element 40 includes a planar seal feature or side seal member 64 in the region between the filter element interlocking feature 44 and the main seal plane 48 of the filter element 40. The side seal member 64 fills in the entire region between the filter element interlocking feature 44 and the main seal plane 48 with additional sealing material. The side seal member 64 extends in a substantially planar manner along the side wall 62 of the filter element 40 (and may match the curvature of the filter media 42, if curved). The region below the filter element interlocking feature 44 still interlocks with the filter housing 30.

The side seal member 64 may prevent the side walls 62 of the filter element 40 from caving inward slightly when the filter media 42 is wet and dirty and under a vacuum collapse scenario. Additionally, as shown in FIGS. 17A-17B and 20A-20B, the side seal member 64 may allow a filter cover 50 that does not include the cover interlocking feature 54 and does not interlock with the housing interlocking feature 34 or the filter element interlocking feature 44 to sealably attach to the filter housing 30 and the filter element 40.

The side seal member 64 may be formed out of a variety of different materials. The side wall may comprise one material or may include two materials (e.g., a hard urethane to form an endcap and a softer urethane to form seal zones). Additionally, the side wall may be a separate component that is molded from a gasket-type material (i.e., EPDM, HNBR, Neoprene, etc.) and installed onto the rest of the filter element 40.

The Interlocking Features

The three-dimensional housing interlocking feature 34, the filter element interlocking feature 44, and the filter cover interlocking feature 54 on the filter housing 30, the filter element 40, and the filter cover 50 may interlock with each other along the sealing interface of the filter assembly 20 and form a seal between the filter assembly elements (e.g., the filter housing 30, the filter element 40, and the filter cover 50) when the filter assembly elements are assembled together and attached to each other. The interlocking features 34, 44, 54 (e.g., the "arched humps") provide mass stability for the filter element 40.

The three-dimensional sealing interface between the filter housing 30, the filter element 40, and the filter cover 50 (which is created by the housing interlocking feature 34, the filter element interlocking feature 44, and the filter cover interlocking feature 54) may improve the sealing integrity and stability of the overall system function and provide a more robust seal within the filter assembly 20 compared to conventional filter assemblies. The housing interlocking feature 34, the filter element interlocking feature 44, and the filter cover interlocking feature 54 may minimize and control any movement of the filter element 40 within the filter assembly 20 during normal use or within hard vibration environments. For example, the housing interlocking feature 34, the filter element interlocking feature 44, and the filter cover interlocking feature 54 may prevent the filter element 40 from freely moving in the x, y, or z directions when the filter assembly 20 is assembled. The housing interlocking feature 34, the filter element interlocking feature 44, and the filter cover interlocking feature 54 may also stabilize the center of mass movement and the weight of the filter element 40 under high oscillatory input loads and during harsh vibration loads, while the filter seal integrity of the filter assembly 20 is maintained. Due to the reduction of vibration of the filter element 40, issues with the filter assembly seal wearing away or failing may therefore be reduced. The housing interlocking feature 34, the filter element interlocking feature 44, and the filter cover interlocking feature 54 may also allow an operator to easily assemble the filter element 40 within the filter assembly 20. Furthermore, the housing interlocking feature 34, the filter element interlocking feature 44, and the filter cover interlocking feature 54 of the filter assembly 20 are also low cost and the filter assembly no longer requires an expensive plastic endcap, thereby creating a low cost filter assembly 20.

As shown in FIGS. 1B and 2A-2B and 11C-11D, the filter element 40 fits into the top portion of the filter housing 30 and the filter cover 50 fits onto and over the top portion of the filter element 40. The filter cover 50 attaches to a top portion of at least one of the filter element 40 and/or the filter housing 30. Accordingly, the housing interlocking feature 34, the filter element interlocking feature 44, and the filter cover interlocking feature 54 are each positioned on corresponding, respective side walls 32 of the filter housing 30, the filter element 40 (e.g., the side wall 62 of the filter element 40), and the filter cover 50 (e.g., the side wall 52 of the filter cover 50) and accordingly can be stacked on top of each other. For example, the filter element interlocking feature 44 is positioned on the side wall 62 of the filter element 40. The housing interlocking feature 34 is positioned on a corresponding side wall 32 of the filter housing 30 and the filter cover interlocking feature 54 is positioned on a corresponding side wall 52 of the filter cover 50. Accordingly, when the filter assembly 20 is assembled, each of the housing interlocking feature 34, the filter element interlocking feature 44, and the filter cover interlocking feature 54 extend along the side wall 62 of the filter element 40.

Each of the housing interlocking feature 34, the filter element interlocking feature 44, and the cover interlocking feature 54 also creates a unique "filter signature" within the filter assembly 20 to ensure that the correct filter housing 30, filter element 40, and filter cover 50 are installed together. For example, the filter housing 30, the filter element 40, and the filter cover 50 cannot be properly and sealably attached to each other if the housing interlocking feature 34, the filter element interlocking feature 44, and the cover interlocking feature 54 are complementary to each other, which prevents incorrect or unauthorized components from being installed within the filter assembly 20. The housing interlocking feature 34, the filter element interlocking feature 44, and the cover interlocking feature 54 also creates a "one-way fit" to ensure that each of the filter housing 30, the filter element 40, and the filter cover 50 are assembled together in the correct orientation relative to each other, which may be particularly beneficial in filter assemblies with a circular cross-section (as shown in FIGS. 11A-11D).

Figure 12:
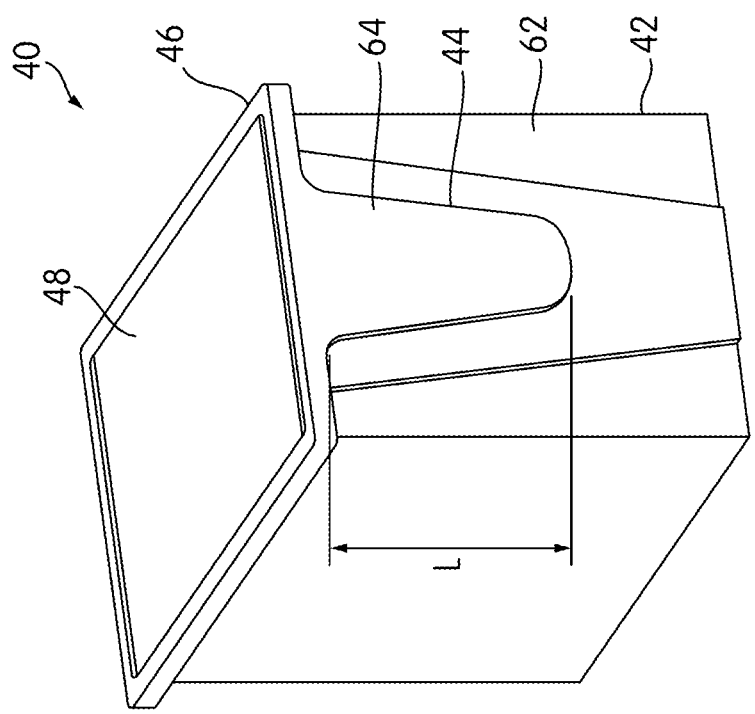
FIG. 12 is a perspective view of a filter element according to one embodiment.

In order to create the unique "filter signature" and the "one-way fit," the number, position (e.g., relative spacing), size, and shape of the interlocking features 34, 44, 54 may be unique to the filter assembly 20 and vary according to the desired configuration. The variations of the different interlocking features 34, 44, 54 create many different unique filter assemblies. For example, the filter assembly 20 may have three of each of the interlocking features 34, 44, 54 that are each spaced approximately 120° from each other. Alternatively, two of each of the interlocking features 34, 44, 54 may be spaced approximately 80° from each other and the third of each of the interlocking features 34, 44, 54 is spaced approximately 140° apart from the other two. As used herein, "approximately" should be interpreted as including at least a de minimis level of variance from the identified value. Alternatively or additionally, the depth or length L (as shown in FIGS. 12 and 14) and/or angle of each of the interlocking features 34, 44, 54 may be unique to the filter assembly 20.

Figure 2B:
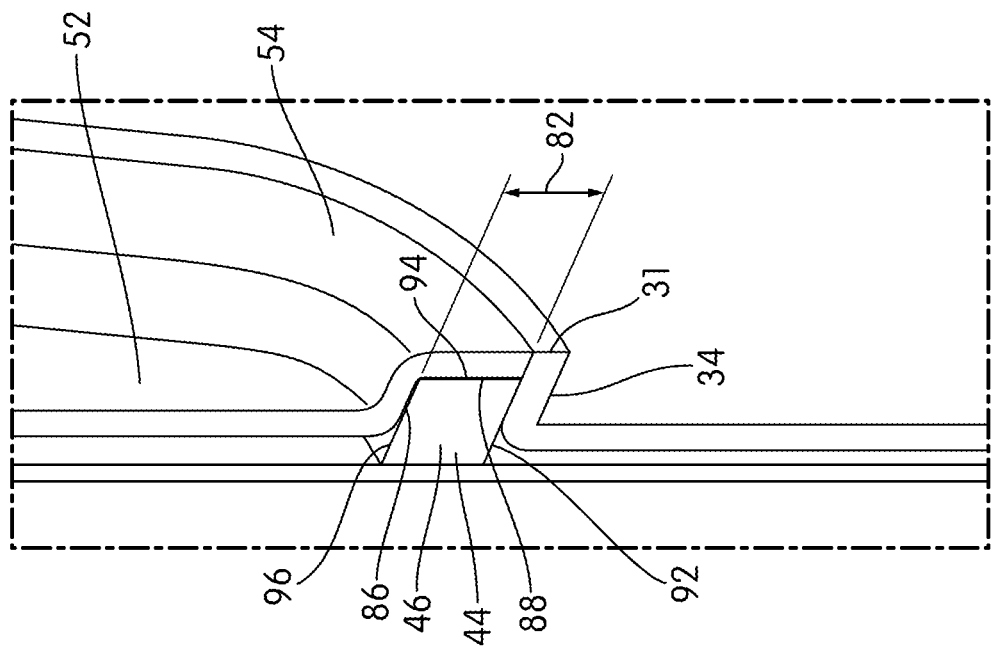
FIG. 2B is a close up view of a portion of FIG. 2A.
Figure 2A:
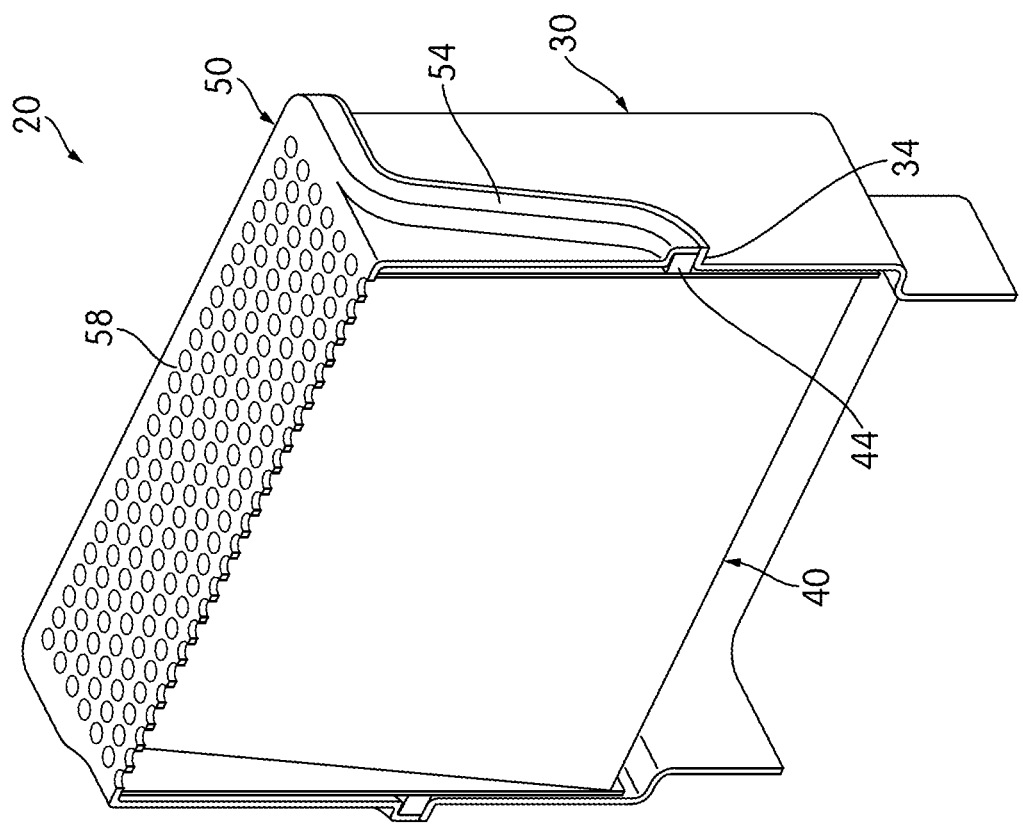
FIG. 2A is a cross-sectional perspective view of the filter assembly of FIG. 1A.

The housing interlocking feature 34, the filter element interlocking feature 44, and the filter cover interlocking feature 54 interlock and directly abut each other when the filter assembly 20 is assembled such that the filter element interlocking feature 44 is interlocked within the housing interlocking feature 34 and the filter cover interlocking feature 54. Accordingly, the housing interlocking feature 34 and the filter cover interlocking feature 54 cover the outer sides (e.g., the top, bottom, and one side) of the filter element interlocking feature 44. For example, as shown in FIGS. 1A-2B, the upper edge or perimeter of the filter housing 30 includes a lip 31 that extends substantially perpendicularly to the respective side walls 32 of the filter housing 30. As shown in FIG. 2B, the filter seal member 46 has a substantially square or rectangular cross-section (although it is understood that the filter seal member 46 can have a circular cross-section) and a bottom portion, side, or lower surface 92 of the filter seal member 46 rests on top of the lip 31 of the upper edge of the filter housing 30. Accordingly, the lip 31 of the filter housing 30 covers at least the lower surface 92 of the filter seal member 46 (including the bottom of the filter element interlocking feature 44).

The lower edge of the filter cover 50 (including the filter cover interlocking feature 54) fits over the top portion, side, or surface 96 (and optionally the side portion, side, or surface 94) of the filter element interlocking feature 44. For example, as shown in FIGS. 1A-1B, the lower edge of the filter cover 50 includes a lip 84 along a region of the top portion 58 where the interlocking feature 54 does not extend from. The lip 84 extends substantially perpendicularly to the top portion 58 of the filter cover 50 and thus overlaps a side surface 94 of the filter seal member 46 while the top portion 58 of the filter cover 50 overlaps the top surface 96 of the filter seal member 46 in regions of the filter cover 50 where the interlocking feature 54 does not extend from.

As shown in FIG. 2B, along the interlocking feature 54 of the filter cover 50, the filter cover 50 includes a perpendicular first lip 86 along the interlocking feature 54 that extends substantially perpendicularly to the side wall 52 of the filter cover 50 and overlaps the top surface 96 of the filter element interlocking feature 44 of the filter seal member 46. A parallel second lip 88 extends from and forms a recess with the perpendicular first lip 86. The parallel second lip 88 is substantially parallel to the side wall 52 such that the parallel second lip 88 overlaps the side surface 94 of the filter element interlocking feature 44 of the filter seal member 46. Accordingly, the filter element interlocking feature 44 fits at least partially within the recess formed by the first and second lips 86 and 88 within the filter cover interlocking feature 54 and fits on top of the housing interlocking feature 34 or within a seal pocket or cavity 36 formed by the housing interlocking feature 34, thereby creating a compression seal zone 82 between the housing interlocking feature 34, the filter element interlocking feature 44, and the filter cover interlocking feature 54.

As shown in FIG. 2B, the upper and lower edges (including respective lips, the housing interlocking feature 34 and the filter cover interlocking feature 54) of the filter housing 30 and the filter cover 50, respectively, directly abut each other. Each of the housing interlocking feature 34, the filter element interlocking feature 44, and the filter cover interlocking feature 54 may form a seal with each other within the same seal zone 82.

The housing interlocking feature 34 and the filter cover interlocking feature 54 may be formed from an outer perimeter or edge of the filter housing 30 and the filter cover 50, respectively. Accordingly, the upper and lower edges of the filter housing 30, respectively, and the filter cover 50 may be nonplanar and the shapes of each of the edges may directly correspond to each other to create the interlocking seal. The filter element interlocking feature 44 of the filter element 40 may be formed from the filter seal member 46, which may also be nonplanar. The shape of the filter seal member 46 may directly correspond to the upper and lower edges of each of the filter housing 30 and the filter cover 50, respectively, to complete the interlocking seal.

The housing interlocking feature 34, the filter element interlocking feature 44, and the filter cover interlocking feature 54 may form a seal with each other and may be configured in a variety of different interlocking and complementary shapes that are or have nonplanar surfaces. For example, in the embodiment shown in FIGS. 1A-1B, the outer perimeter or upper edge of the filter housing 30, the filter seal member 46 of the filter element 40, and the outer perimeter or lower edge of the filter cover 50 each have a flat upper portion and a housing interlocking feature 34, filter element interlocking feature 44, or filter cover interlocking feature 54 that extends from the respective flat upper portion. The flat upper portion of each of the filter housing, the filter element 40, and the filter cover 50 lies within the main seal plane 48 when the filter assembly 20 is assembled.

The housing interlocking feature 34, the filter element interlocking feature 44, and the filter cover interlocking feature 54 each extend substantially perpendicularly to the flat upper portions, outside of the main seal plane 48. The housing interlocking feature 34, the filter element interlocking feature 44, and the filter cover interlocking feature 54 have complementary and interlocking wedge shapes or curves in order to interlock with and secure within each other. Accordingly, each of the housing interlocking feature 34, the filter element interlocking feature 44, and the filter cover interlocking feature 54 each have first and second nonparallel side portions (e.g., the side portions are not parallel to each other) that converge to a curved central portion. Each of the side portions and the central portions may extend parallel to and alongside the end wall or side wall 62 of the filter element 40 when the filter assembly 20 is assembled. As shown in FIG. 16C, when the filter assembly 20 is assembled, the filter cover interlocking feature 54 may fit within a cavity 47 formed by the filter element interlocking feature 44. As further shown in FIG. 16C, the filter element interlocking feature 44 may fit within a cavity 36 formed by the housing interlocking feature 34.

According to one embodiment as shown in FIG. 1B, the housing interlocking feature 34 includes first and second housing interlocking feature side portions 33 and a housing interlocking feature central portion 35 that extends between the first and second housing interlocking feature side portions 33. The first and second housing interlocking feature side portions 33 and the housing interlocking feature central portion 35 together define a filter housing void, recess, seal pocket, or cavity 36 within the side wall 32 of the filter housing 30. As shown in FIG. 1B, the housing interlocking feature side portions 33 are not parallel to each other and converge to the housing interlocking feature central portion 35. However, it is understood that the housing interlocking feature side portions 33 could be parallel to each other.

As further shown in FIG. 1B, the filter element interlocking feature 44 is a protruding portion of the filter seal member 46 that is defined by first and second filter element interlocking feature side portions 43 and a filter element interlocking feature central portion 45 that extends between the first and second filter element interlocking feature side portions 43. The first and second filter element interlocking feature side portions 43 and the filter element interlocking feature central portion 45 fit within the housing cavity 36 formed by the housing interlocking feature 34. The first and second filter element interlocking feature side portions 43 and the filter element interlocking feature central portion 45 define a filter element void, recess, seal pocket, or cavity 47, as shown in FIG. 16C. As shown in FIG. 1B, the filter element interlocking feature side portions 43 are not parallel to each other and converge to the filter element interlocking feature central portion 45. However, it is understood that the filter element interlocking feature side portions 43 could be parallel to each other.

As also shown in FIG. 1B, the filter cover interlocking feature 54 is an extension that is defined by first and second filter cover interlocking feature side portions 53 and a filter cover interlocking feature central portion 55 that extends between the first and second filter cover interlocking feature side portions 53. The first and second filter cover interlocking feature side portions 53 and the filter cover interlocking feature central portion 55 fit within the filter element cavity 47 formed by the filter element interlocking feature 44. As shown in FIG. 1B, the filter cover interlocking feature side portions 53 are not parallel to each other and converge to the filter cover interlocking feature central portion 55. However, it is understood that the filter cover interlocking feature side portions 53 could be parallel to each other according to other embodiments.

As shown in FIG. 16C, the filter assembly 20 may have a variety of different dimensions. For reference in FIG. 16C, the inside of the filter housing 30 may be on the left of the filter housing 30 and the outside of the filter housing 30 may be to the right of the filter housing 30. The various components may be sized in order to create gaps 91 in certain areas within the filter assembly for more easy installation and interlock. For example, the dimension 110 of the bone of the filter seal member 46 to the side wall 32 of the filter housing 30 may be approximately 18-23 millimeters (mm), 23-28 mm in particular embodiments, or 28-38.1 mm in more particular embodiments.

In order to improve filter stability, the cover interlock tongue 97 overlaps a filter ledge 93 of the filter housing 30 by at least a portion, as shown in FIG. 16C. For example, the dimension 112 may be greater than 0 to approximately 4 mm, preferably 4-8 mm, or optimally greater than 8 mm. In order to improve the seal formed between the filter housing 30, the filter element 40, and the filter cover 50, the cover interlocking feature 54 may overlap a housing ledge 95 by at least a portion, as further shown in FIG. 16C. Accordingly, the width of the housing ledge 95 (as shown as dimension 114) may be greater than 0 to approximately 4 mm (or 6 mm), preferably 6-12 mm, or optimally greater than 12 mm.

It is also understood that other nonplanar variants may be used, such as the nonplanar and/or wedge aspects disclosed by U.S. Pat. Nos. 9,415,333, 8,828,114 and 8,061,530, U.S. Patent Application Publication Nos. 2014/0048468 and 2016/0346719, and International Publication No. WO 2015/187538, the entire disclosures of which are incorporated by reference herein in their entirety.

The Housing Receptacle and the Filter Element Protruding Portion

Figure 17B:
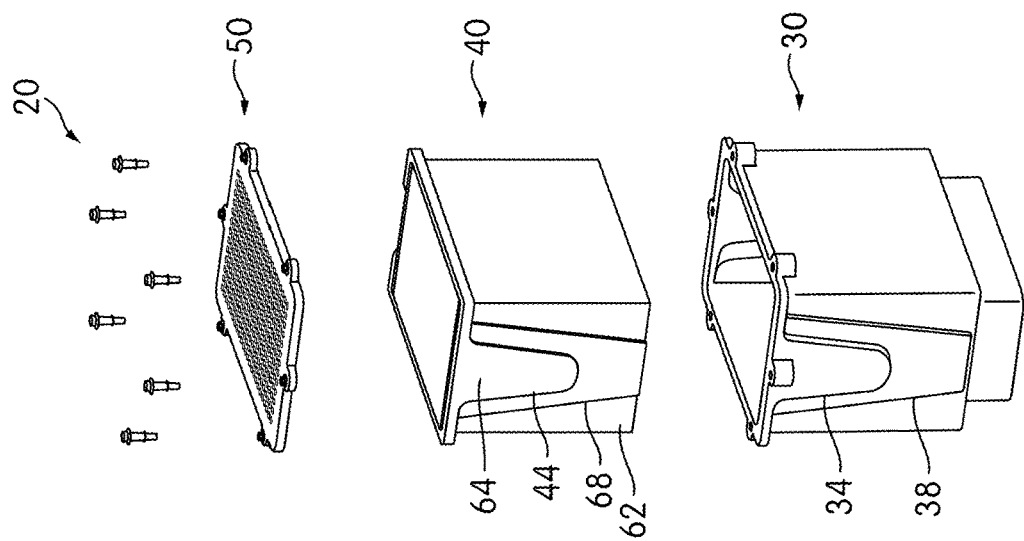
FIG. 17B is an exploded view of the filter assembly of FIG. 17A.
Figure 17A:
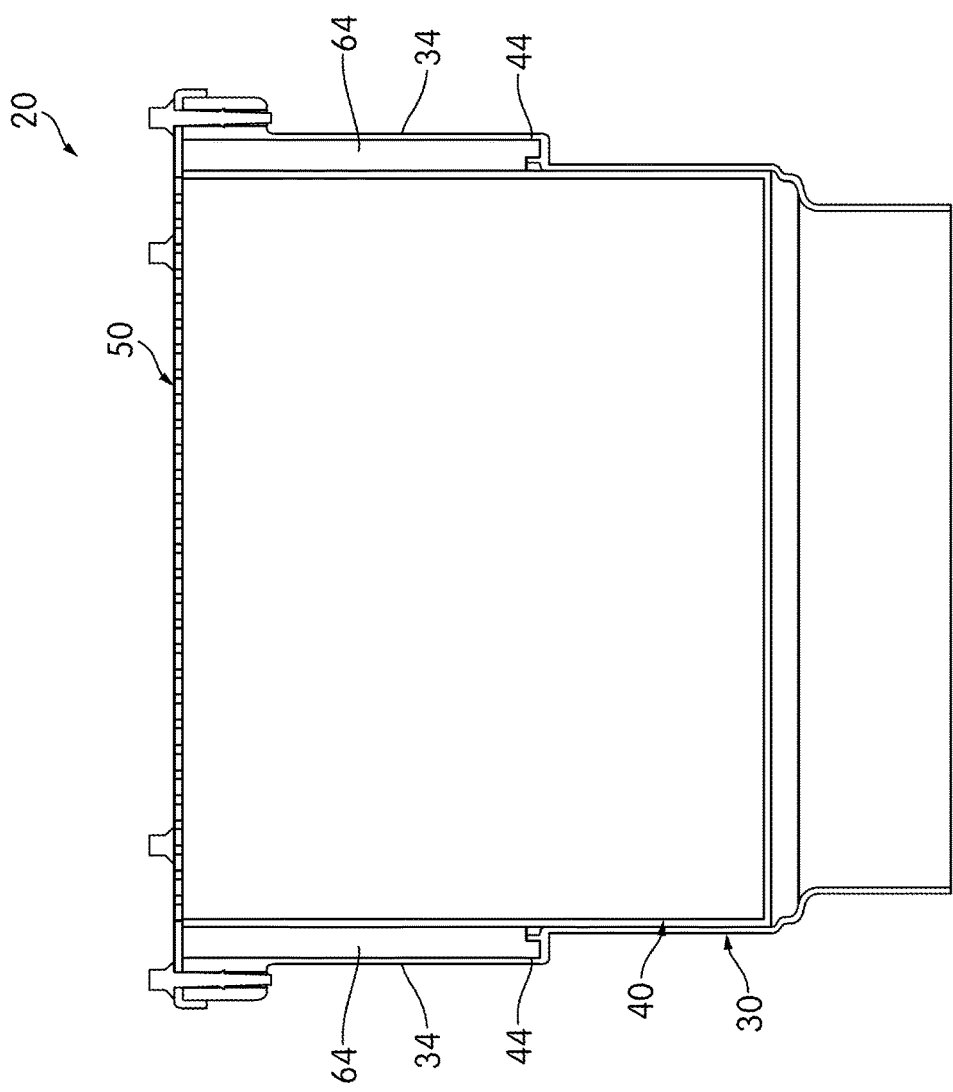
FIG. 17A is a cross-sectional view of a filter assembly according to another embodiment.
Figure 19B:
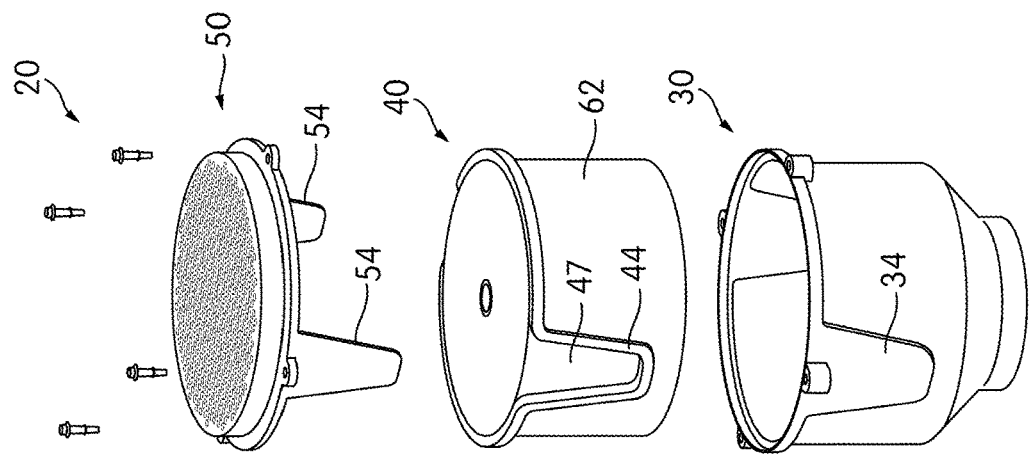
FIG. 19B is an exploded view of the filter assembly of FIG. 19A.
Figure 19A:
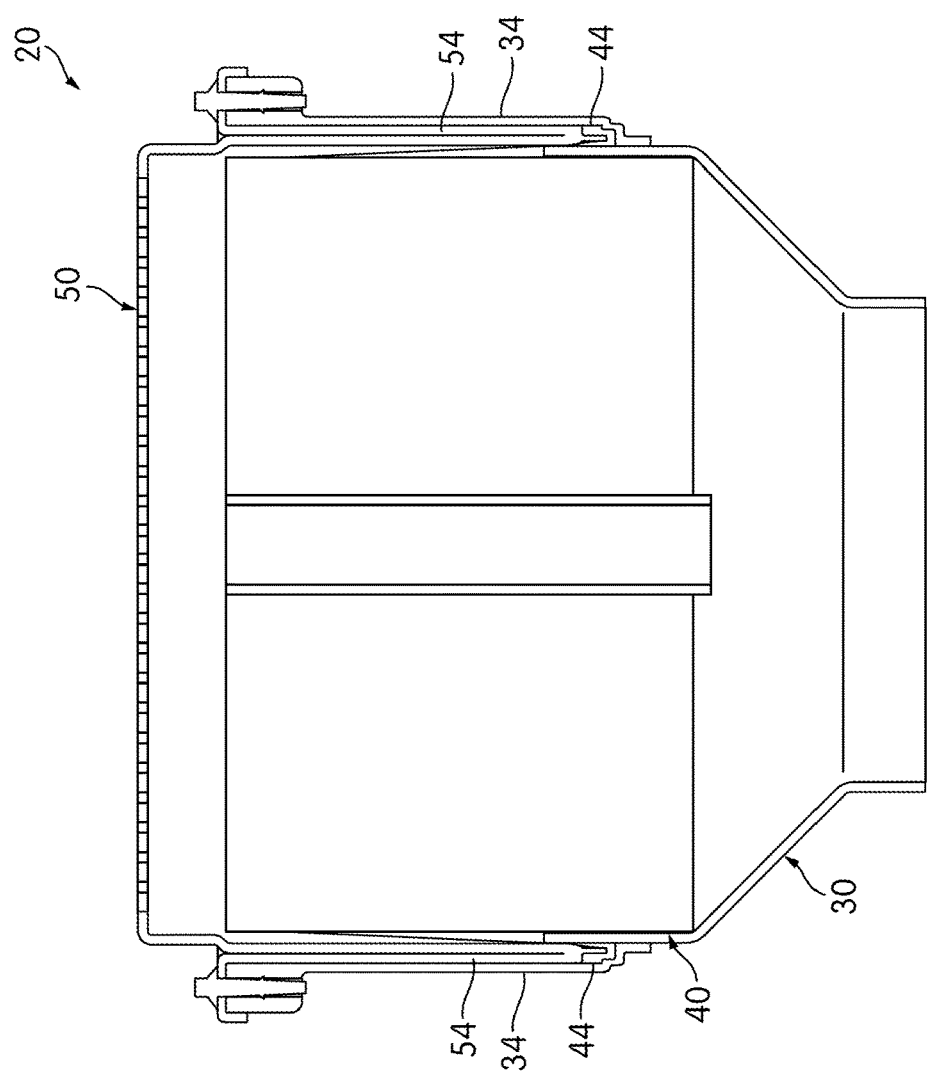
FIG. 19A is a cross-sectional view of a filter assembly according to still another embodiment.
Figure 20B:
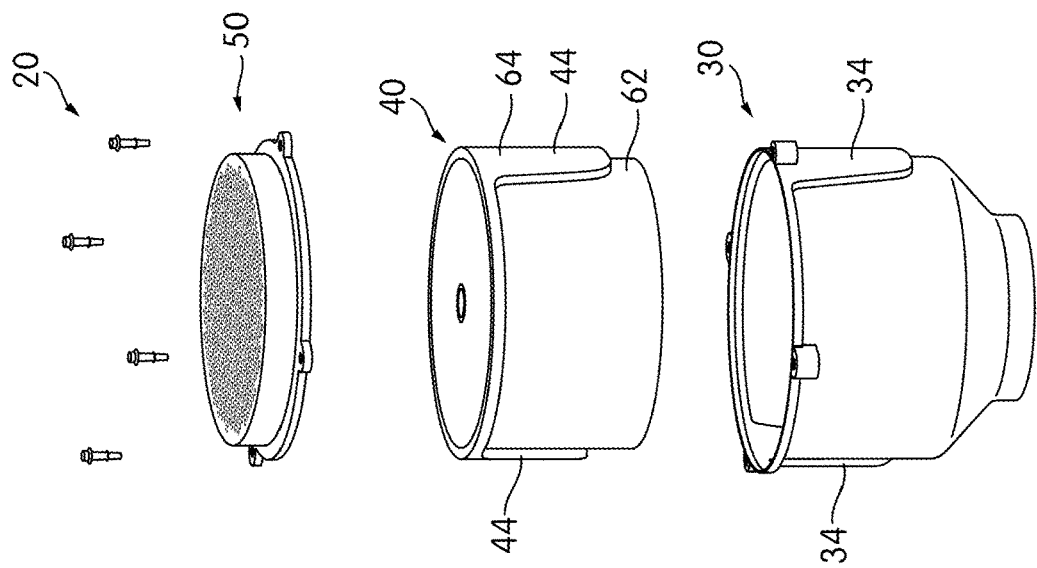
FIG. 20B is an exploded view of the filter assembly of FIG. 20A.
Figure 20A:
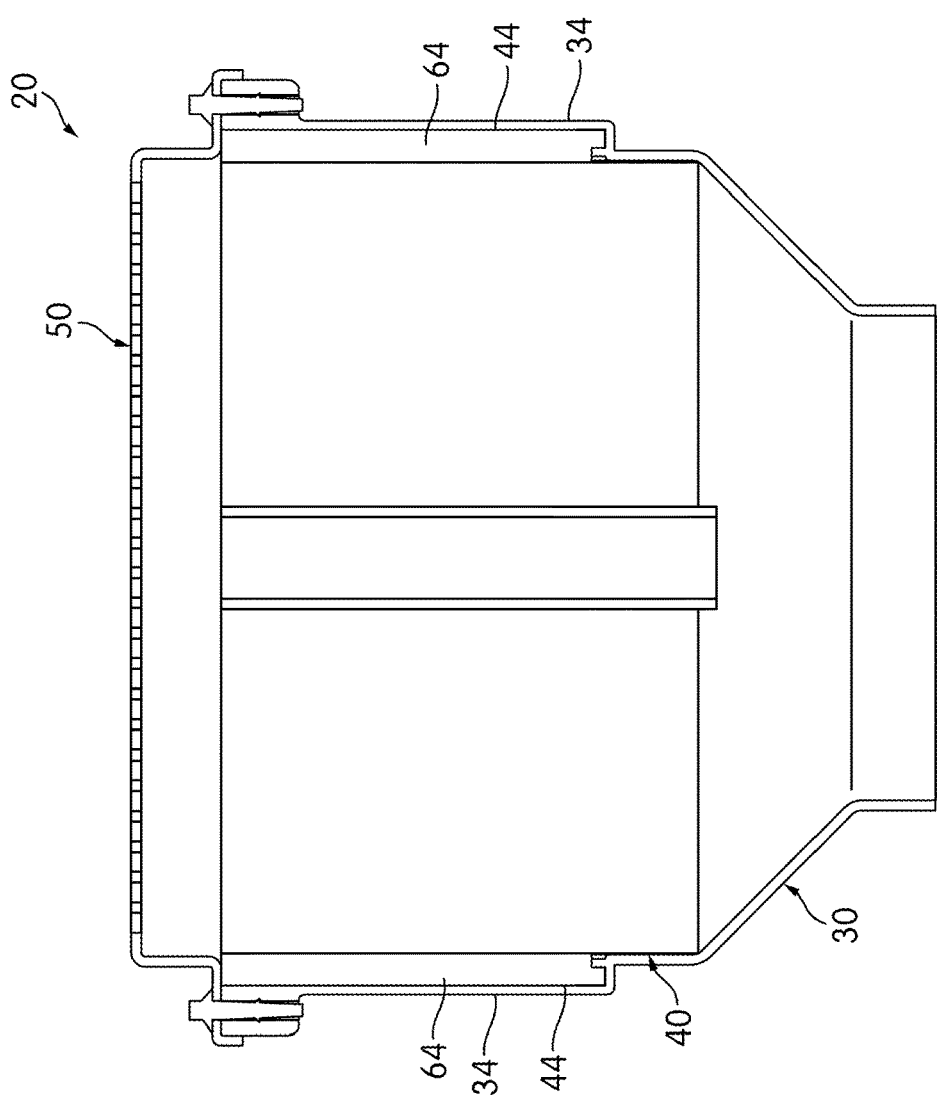
FIG. 20A is a cross-sectional view of a filter assembly according to another embodiment.

According to another embodiment as shown in FIGS. 3A, 6A-6B, 7A-7B, and 8, in order to further interlock and fit the filter element 40 and the filter housing 30 together and easily and correctly position the filter element 40 within the filter housing 30 (during, for example, assembly or service events), the filter element 40 and the housing 30 includes locating details, such as a male locating element or protruding portion 68 on the filter element 40 and a corresponding female locating element or receptacle 38 on the filter housing 30. As shown in FIGS. 16B and 17B, the protruding portion 68 of the filter element 40 abuts and fits within the receptacle 38 of the filter housing 30 when the filter assembly 20 is assembled in order to further secure and interlock the filter element 40 within the filter housing 30. As shown in the interlocked filter assembly 20 of FIG. 3A, the filter housing 30 includes both the housing interlocking feature 34 and the receptacle 38.

The protruding portion 68 may be positioned along the side wall 62 of the filter element 40. The protruding portion 68 may be a thicker or raised inner portion of the side wall 62 that protrudes from the outer side of the side wall 62. The protruding inner portion 68 may extend beyond an outer portion 66 of the side wall 62 in order to be inserted within and interlock with the receptacle 38 of the filter housing 30. The outer portion 66 (which may be thinner than the protruding portion 68) is positioned outside of the protruding portion 68 along the outer side of the side wall 62.

The receptacle 38 may be positioned along the side wall 32 of the filter housing 30 (that corresponds to the side wall 62 of the filter element 40). In order to receive the protruding portion 68, the receptacle 38 may be recessed along the inner side of the side wall 32 of the filter housing 30.

Figure 8:
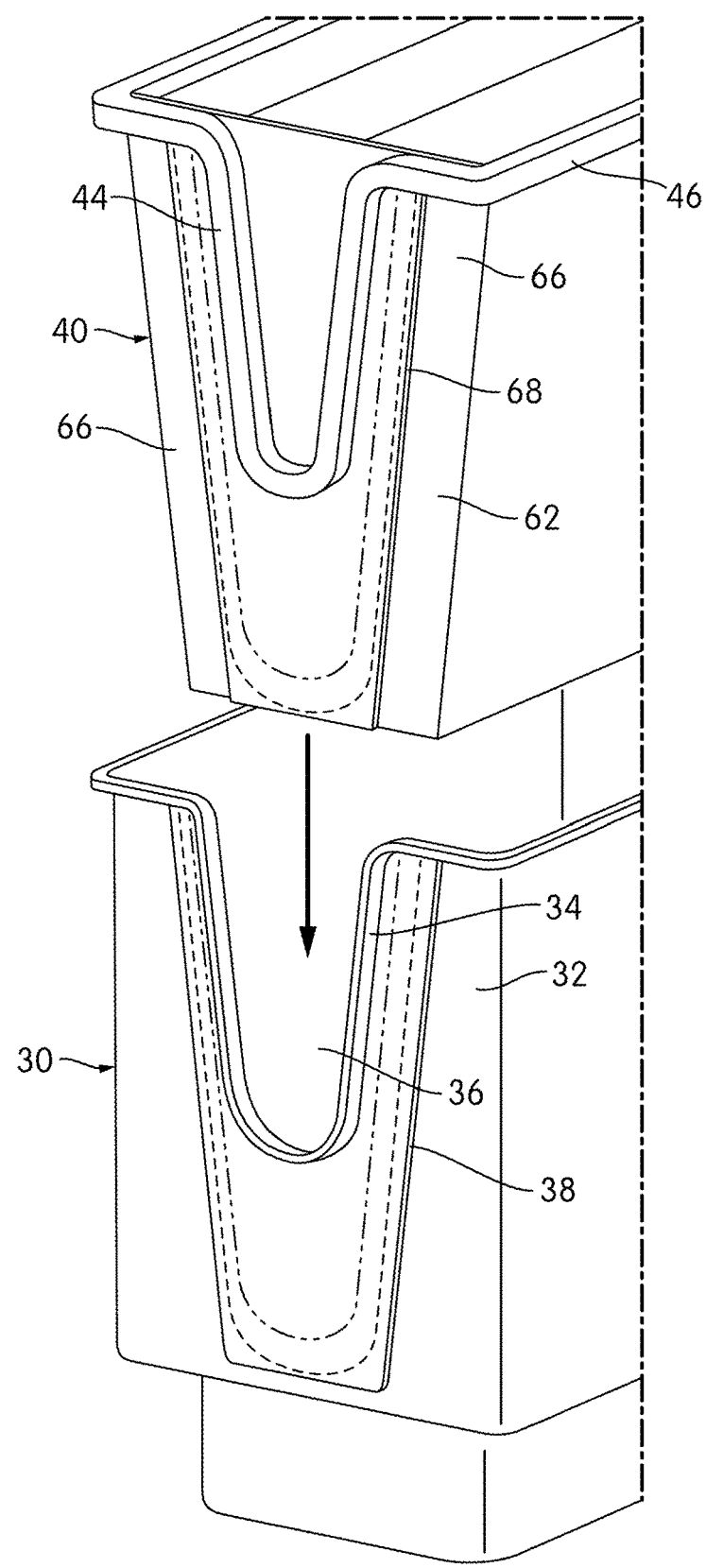
FIG. 8 is an exploded view of a filter element and a filter housing according to an embodiment.

The respective shape and size of the protruding portion 68 and the receptacle 38 correspond with each other such that the protruding portion 68 fits within the receptacle 38. The protruding portion 68 and the receptacle 38 may be a variety of different shapes and sizes. For example, as shown in FIG. 8, the protruding portion 68 and the receptacle 38 each have a trapezoidal shape in which the protruding portion 68 and the receptacle 38 each have first and second nonparallel sides and a straight central lower side that extends between and connects the first and second nonparallel sides along the respective side walls 62 and 32. According to another embodiment as shown in FIGS. 6A-8, the protruding portion 68 and the receptacle 38 may each have a curved, parabolic, or circular end portion in which the protruding portion 68 and the receptacle 38 each have first and second nonparallel sides that converge to a curved central portion. The curved central portion can have a variety of different radii according to the desired configuration, as shown in FIG. 8. Regardless of the shape of the protruding portion 68 and the receptacle 38, the protruding portion 68 and the receptacle 38 are shaped and sized such that the protruding portion 68 fits securely within the receptacle 38 when the filter assembly 20 is assembled. Further, the protruding portion 68 and the receptacle 38 may extend along the entire length or a portion of the length of the side wall 62 and the side wall 32, respectively.

According to one embodiment as shown in FIGS. 6A-6B and 7A-7B, the filter assembly 20 only includes the receptacle 38 and the protruding portion 68 in order to interlock the filter housing 30 and the filter element 40 (and may not include the housing interlocking feature 34, the filter element interlocking feature 44, and the filter cover interlocking feature 54). According to another embodiment as shown in FIG. 8, the filter assembly 20 includes both the receptacle 38 and the protruding portion 68 as well as the housing interlocking feature 34, the filter element interlocking feature 44, and the filter cover interlocking feature 54. The shapes of the housing interlocking feature 34 and the filter element interlocking feature 44 may correspond with or be different from the shapes of the receptacle 38 and the protruding portion 68.

Inner Locking Feature

Figure 9:
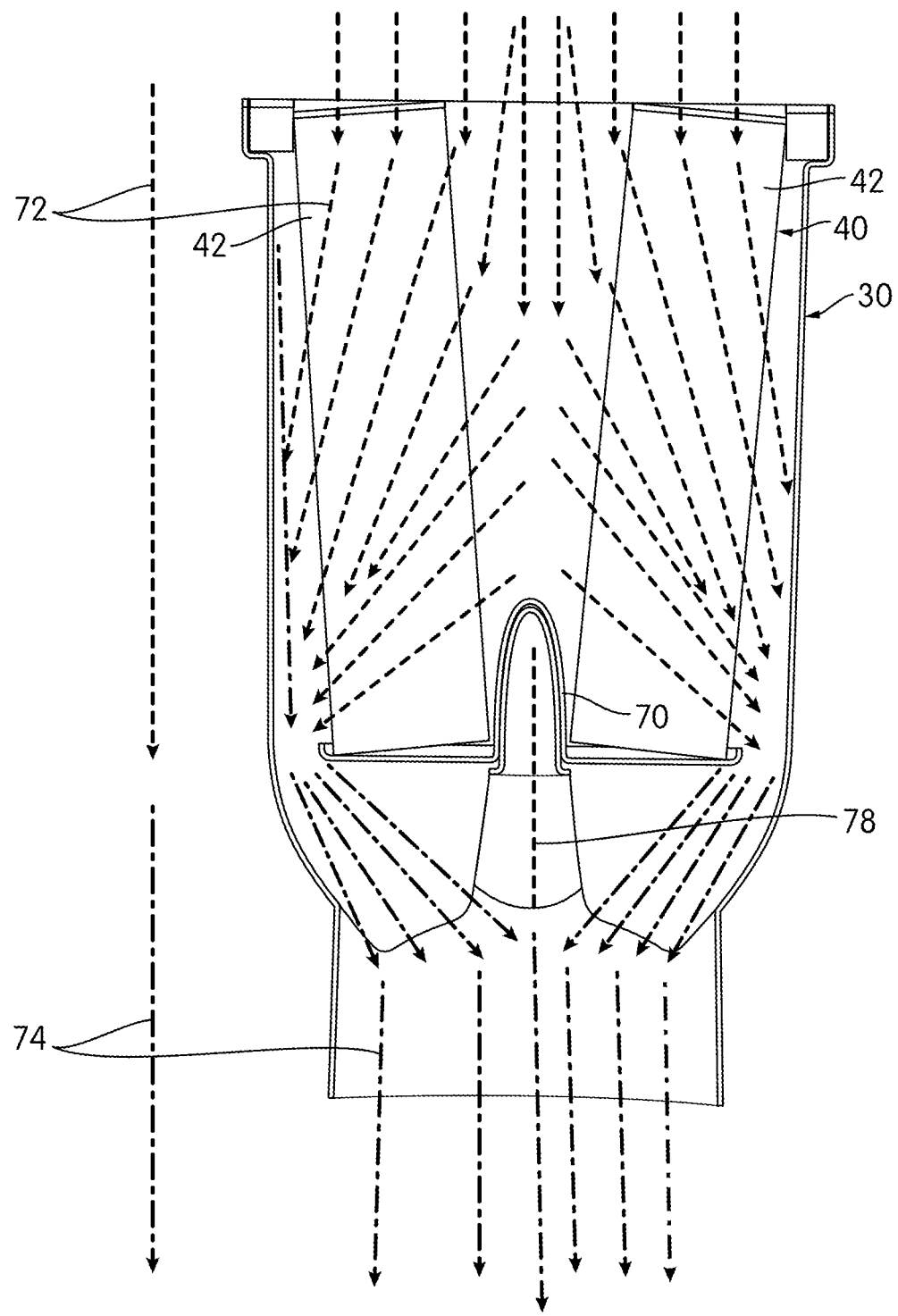
FIG. 9 is a cross-sectional front view of a filter element and a filter housing according to another embodiment.

According to another embodiment as shown in FIGS. 9 and 10A-10B, the filter assembly 20 includes an interlock region or an inner locking feature 70 within the filter housing 30 and between the filter housing 30 and the filter cover 50 in order to further support the filter element 40 within the filter housing 30. The inner locking feature 70 may mate or interlock with the filter element 40 and may comprise an air flow guide to guide the air flow on the inside of the filter inlet plenum (e.g., between the two sheets of filter media 42), to stabilize and support the filter element 40 (particularly under vibration), and to locate the filter element 40 to the center of the filter housing 30.

The inner locking feature 70 may project into the inner region of the filter housing 30 to create boundary surfaces to guide the airflow and to customize the length of the filter element 40 for special filtration requirements. According to one embodiment shown in FIGS. 9-10B, the inner locking feature 70 includes first and second nonparallel side portions that converge to a curved central portion. The first and second nonparallel side portions may support the inner sides of the filter element 40.

The design of the inner locking feature 70 may be refined to optimize the air flow and for stabilization control of the filter assembly 20. For example, the length of the inner locking feature 70 may be changed according to the desired configuration. The first and second nonparallel side portions may extend along small portion of the filter element 40 (as shown in FIG. 10A). Alternatively, the first and second nonparallel side portions may extend along the length of the filter element 40 (as shown in FIG. 10B). FIG. 10A depicts an inner locking feature 70 with a length (1) that is relatively shorter than the inner locking feature 70 shown in FIG. 10B with a length (L). Accordingly, the inner locking feature 70 in FIG. 10A extends along a small portion of the filter element 40 while the inner locking feature 70 in FIG. 10B extends along the entire length of the filter element 40.

As shown in FIG. 9, the inner locking feature 70 is positioned in the center of the filter housing 30, between two portions or sheets of filter media 42 of the filter element 40.

Accordingly, the dirty air flows along the dirty air flow direction 72 through the filter media 42 and becomes clean air that flows along the clean air flow direction 74 through the remainder of the filter housing 30 and to an outlet of the filter housing 30. The inner locking feature 70 may be positioned an outlet side of the filter element 40 (e.g., on the side of the filter element 40 that faces the outlet of the filter housing 30 and is away from the inlet of the filter housing 30).

Although FIG. 9 shows the inner locking feature 70 positioned along the center line 78 of the filter housing, it is understood that the inner locking feature 70 may be off-set from the center line 78 in order to meet lower spatial requirements. The inner locking feature 70 may extend from a portion of the filter housing 30 or the filter cover 50. The inner locking feature may optionally define the interface between the filter housing 30 and the filter cover 50.

It is understood that the various components, configurations, and features of the different embodiments of the filter assembly 20 may be combined according to the desired use and configuration.

The term "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a filter housing having a housing interlocking feature;
   a filter element having a filter seal member; and
   a filter cover coupled to the filter housing, the filter cover comprising:
      a cover interlocking feature extending along a lower edge or an outer perimeter of the filter cover such that the cover interlocking feature interlocks with each of the filter seal member and the housing interlocking feature to secure the filter assembly together; and
      a lip extending along at least a first portion of a top portion of the filter cover, the lip extending substantially perpendicularly to the top portion and overlapping a side surface of the filter seal member,
      wherein the top portion of the filter cover overlaps a top surface of the filter seal member along the first portion of the top portion of the filter cover.

2. The filter assembly of claim 1, wherein the filter seal member comprises a filter element interlocking feature that interlocks with the housing interlocking feature, the cover interlocking feature, or both of the housing interlocking feature and the cover interlocking feature.

3. The filter assembly of claim 1, wherein the filter element includes a filter element interlocking feature that is a protruding portion of the filter seal member defined by a first filter element interlocking feature side portion, a second filter element interlocking feature side portion, and a filter element interlocking feature central portion that extends between the first filter element interlocking feature side portion and the second filter element interlocking feature side portion.

4. The filter assembly of claim 3, wherein the first filter element interlocking feature side portion, the second filter element interlocking feature side portion, and the filter element interlocking feature central portion fit within a housing cavity defined by the housing interlocking feature.

5. The filter assembly of claim 3, wherein the first filter element interlocking feature side portion, the second filter element interlocking feature side portion, and the filter element interlocking feature central portion define a filter element cavity.

6. The filter assembly of claim 3, wherein the first filter element interlocking feature side portion and the second filter element interlocking feature side portion are not parallel to each other and converge to the filter element interlocking feature central portion.

7. The filter assembly of claim 1, wherein the filter cover comprises one or more attachment elements along a perimeter of the filter cover, the one or more attachment elements configured to attach the filter cover to the filter housing.

8. A filter assembly comprising:
   a filter housing having a housing interlocking feature comprising:
      a first housing interlocking feature side portion,
      a second housing interlocking feature side portion, and
      a housing interlocking feature central portion that extends between the first housing interlocking feature side portion and the second housing interlocking feature side portion,
      wherein the first housing interlocking feature side portion, the second housing interlocking feature side portion, and the housing interlocking feature central portion cooperate to define a filter housing cavity within a side wall of the filter housing;
   a filter element having a filter seal member; and
   a filter cover coupled to the filter housing, the filter cover comprising:
      a cover interlocking feature extending along a lower edge or an outer perimeter of the filter cover such that the cover interlocking feature interlocks with each of the filter seal member and the housing interlocking feature to secure the filter assembly together.

9. The filter assembly of claim 8, wherein the filter seal member comprises a filter element interlocking feature that interlocks with the housing interlocking feature, the cover interlocking feature, or both of the housing interlocking feature and the cover interlocking feature.

10. The filter assembly of claim 8, wherein the filter element includes a filter element interlocking feature that is a protruding portion of the filter seal member defined by a first filter element interlocking feature side portion, a second filter element interlocking feature side portion, and a filter element interlocking feature central portion that extends between the first filter element interlocking feature side portion and the second filter element interlocking feature side portion.

11. The filter assembly of claim 10, wherein the first filter element interlocking feature side portion, the second filter element interlocking feature side portion, and the filter element interlocking feature central portion fit within the filter housing cavity defined in the side wall of the filter housing by the housing interlocking feature.

12. The filter assembly of claim 10, wherein the first filter element interlocking feature side portion, the second filter element interlocking feature side portion, and the filter element interlocking feature central portion define a filter element cavity.

13. The filter assembly of claim 10, wherein the first filter element interlocking feature side portion and the second filter element interlocking feature side portion are not parallel to each other and converge to the filter element interlocking feature central portion.

14. The filter assembly of claim 8, wherein the filter cover comprises one or more attachment elements along a perimeter of the filter cover, the one or more attachment elements configured to attach the filter cover to the filter housing.

15. The filter assembly of claim 8, wherein the first housing interlocking feature side portion and the second housing interlocking feature side portion are not parallel to each other and converge to the housing interlocking feature central portion.

* * * * *